United States Patent
Thellefsen et al.

(10) Patent No.: US 11,618,677 B2
(45) Date of Patent: Apr. 4, 2023

(54) REVAMPING OF A CLAUS PLANT WITH A SULFURIC ACID PLAN

(71) Applicant: HALDOR TOPSØE A/S, Kgs. Lyngby (DK)

(72) Inventors: Morten Thellefsen, Hillerød (DK); Mads Lykke, Brønshøj (DK); Martin Møllerhøj, Birkerød (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 17/606,557

(22) PCT Filed: Apr. 29, 2020

(86) PCT No.: PCT/EP2020/061940
§ 371 (c)(1),
(2) Date: Oct. 26, 2021

(87) PCT Pub. No.: WO2020/225063
PCT Pub. Date: Nov. 12, 2020

(65) Prior Publication Data
US 2022/0177306 A1 Jun. 9, 2022

(30) Foreign Application Priority Data

May 3, 2019 (DK) .......................... PA 2019 00543
May 28, 2019 (DK) .......................... PA 2019 00655
(Continued)

(51) Int. Cl.
*B01D 53/86* (2006.01)
*C01B 17/04* (2006.01)
(Continued)

(52) U.S. Cl.
CPC ...... *C01B 17/0404* (2013.01); *B01D 53/1481* (2013.01); *B01D 53/1493* (2013.01);
(Continued)

(58) Field of Classification Search
CPC . C01B 17/0404; C01B 17/80; C01B 17/0253; C01B 17/0447; C01B 17/0452;
(Continued)

(56) References Cited

U.S. PATENT DOCUMENTS 3,617,221 A * 11/1971 Egan .................... C01B 17/0413
423/576.2
4,070,424 A 1/1978 Olson et al.
(Continued)

FOREIGN PATENT DOCUMENTS

CN 106219499 A 12/2016
CN 107311117 A 11/2017
(Continued)

OTHER PUBLICATIONS

Danish Search Report dated Dec. 4, 2019 by the Danish Patent and Trademark Office in corresponding Danish Patent Application No. PA 2019 00681. (9 pages).
(Continued)

*Primary Examiner* — Timothy C Vanoy
(74) *Attorney, Agent, or Firm* — Buchanan Ingersoll & Rooney P.C.

(57) ABSTRACT

A revamp process for modifying a sulfur abatement plant including a Claus process plant, the Claus process plant including a Claus reaction furnace and one or more Claus conversion stages, each Claus conversion stage including a conversion reactor and a means for elemental sulfur condensation, and a means of Claus tail gas oxidation configured for receiving a Claus tail gas from said Claus process plant and configured for providing an oxidized Claus tail
(Continued)

gas, the process revamp including: a) providing a sulfuric acid producing tail gas treatment plant producing sulfuric acid, and b) providing a means for transferring an amount or all of the sulfuric acid produced in said sulfuric acid producing tail gas treatment plant to said Claus reaction furnace, wherein the moles of sulfur in the transferred sulfuric acid relative to the moles of elemental sulfur withdrawn from the Claus process plant is from 3% to 25%.

16 Claims, 5 Drawing Sheets

(30) Foreign Application Priority Data

Jun. 4, 2019 (DK) .............. PA 2019 00681
Jun. 5, 2019 (DK) .............. PA 2019 00687

(51) Int. Cl.
| | | |
|---|---|---|
| *C01B 17/80* | (2006.01) | |
| *C01B 17/02* | (2006.01) | |
| *B01J 19/00* | (2006.01) | |
| *B01J 19/24* | (2006.01) | |
| *C01B 17/775* | (2006.01) | |
| *B01D 53/14* | (2006.01) | |
| *C01B 17/76* | (2006.01) | |
| *F23G 7/06* | (2006.01) | |

(52) U.S. Cl.
CPC ...... *B01D 53/8615* (2013.01); *B01J 19/0013* (2013.01); *B01J 19/2405* (2013.01); *B01J 19/2465* (2013.01); *C01B 17/0253* (2013.01); *C01B 17/0447* (2013.01); *C01B 17/0452* (2013.01); *C01B 17/0456* (2013.01); *C01B 17/76* (2013.01); *C01B 17/775* (2013.01); *C01B 17/80* (2013.01); *C01B 17/806* (2013.01); *F23G 7/06* (2013.01); *B01D 2255/20723* (2013.01); *B01J 2219/00157* (2013.01); *C01P 2006/80* (2013.01); *F23G 2209/14* (2013.01)

(58) Field of Classification Search
CPC . C01B 17/0456; C01B 17/775; C01B 17/806; C01B 17/76; B01D 53/8615; B01D 53/1481; B01D 53/1493; B01D 2255/20723; B01J 19/0013; B01J 19/2405; B01J 19/2465; B01J 2219/00157; F23G 7/06; F23G 2209/14; C01P 2006/80
See application file for complete search history.

(56) References Cited

U.S. PATENT DOCUMENTS

| | | |
|---|---|---|
| 4,208,192 A | 6/1980 | Quigley et al. |
| 4,826,670 A | 5/1989 | Hegarty |
| 5,278,123 A | 1/1994 | Chopin et al. |
| 6,056,936 A | 5/2000 | Nougayrede et al. |
| 2009/0226353 A1 | 9/2009 | Tekie et al. |
| 2017/0044015 A1 | 2/2017 | Rameshni et al. |

FOREIGN PATENT DOCUMENTS

| | | |
|---|---|---|
| CN | 207468199 U | 6/2018 |
| DE | 2430909 A1 | 1/1976 |
| EP | 0134594 A1 | 3/1985 |
| EP | 0633219 A1 | 1/1995 |
| EP | 2878358 A1 | 6/2015 |
| EP | 2878367 A1 | 6/2015 |
| WO | 2012089776 A1 | 7/2012 |
| WO | 2012152919 A1 | 11/2012 |
| WO | 2016198369 A1 | 12/2016 |
| WO | 2017220655 A1 | 12/2017 |
| WO | 2018096178 A1 | 5/2018 |
| WO | 2018169903 A1 | 9/2018 |

OTHER PUBLICATIONS

Danish Search Report dated Dec. 6, 2019 by the Danish Patent and Trademark Office in corresponding Danish Patent Application No. PA 2019 00687. (9 pages).
Danish Search Report dated Oct. 29, 2019 by the Danish Patent and Trademark Office in corresponding Danish Patent Application No. PA 2019 00655. (10 pages).
Danish Search Report dated Oct. 9, 2019 by the Danish Patent and Trademark Office in corresponding Danish Patent Application No. PA 2019 00543. (10 pages).
International Search Report (PCT/ISA/210) and Written Opinion (PCT/ISA/237) dated Jul. 17, 2020, by the European Patent Office as the International Searching Authority for International Application No. PCT/EP2020/061934. (12 pages).
International Search Report (PCT/ISA/210) and Written Opinion (PCT/ISA/237) dated Jul. 14, 2020, by the European Patent Office as the International Searching Authority for International Application No. PCT/EP2020/061940. (9 pages).
International Search Report (PCT/ISA/210) and Written Opinion (PCT/ISA/237) dated Jul. 29, 2020, by the European Patent Office as the International Searching Authority for International Application No. PCT/EP2020/061939. (9 pages).
International Search Report (PCT/ISA/210) and Written Opinion (PCT/ISA/237) dated Jun. 29, 2020, by the European Patent Office as the International Searching Authority for International Application No. PCT/EP2020/061937. (8 pages).

\* cited by examiner

REVAMPING OF A CLAUS PLANT WITH A SULFURIC ACID PLAN

The present invention is related to a revamp process for improving one or more of the sulfur removal, the operational cost and the capacity of a sulfur abatement plant. for conversion of $H_2S$ to elemental sulfur and sulfuric acid.

$H_2S$ is a common side product in many processes, including hydrodesulfurization of refinery streams, natural gas processing and production of viscose fibres. It is desirable to convert $H_2S$ prior to emission to the atmosphere as $H_2S$ is highly toxic, odorous and an environmental challenge.

Refinery processes, besides producing the well-known high concentration $H_2S$ gas, may often also produce a so-called sour water stripper gas, which comprises $H_2S$, $H_2O$ and $NH_3$ in approximately equal amounts.

Especially in refineries, the chosen process for $H_2S$ abatement has been the Claus process, which has been known and optimized for more the 8 decades. The Claus process proceeds by sub-stoichiometric combustion of $H_2S$ producing $SO_2$ in a Claus reaction furnace, providing a Claus converter feed gas. The subsequent Claus process will convert $H_2S$ and $SO_2$ to form elemental sulfur, which may be condensed and withdrawn.

Typically, the sulfur removal efficiency of the Claus process is 95% to 98%, which is insufficient for environmental compliance. Therefore, it is common practice to provide a tail gas treatment after the Claus process to provide sulfur abatement above 99%. The tail gas treatment can be a sulfuric acid plant, which introduces the requirement for handling of sulfuric acid.

It has now been identified that the existing Claus plant can be revamped by addition of a sulfuric acid plant from which sulfuric acid may be recycled to the Claus reaction furnace, where it may contribute to the formation of elemental sulfur, and in addition provide opportunities for optimization of the Claus and Claus tail gas process size and operational cost.

In WO 2012/152919 A1, a sulfuric acid process for treatment of Claus tail gas is presented in which the conversion of $H_2S$ to $H_2SO_4$ in a Claus tail gas is described. The steps in the process are:
1. Sub-stoichiometric oxidation
2. Claus conversion
3. Oxidation of reduced sulfur species ($H_2S$) in the Claus tail gas in oxygen rich atmosphere at 400-700° C.
4. Catalytic oxidation of $SO_2$ to $SO_3$
5. Condensation of $H_2SO_4$ It is recognized that the $H_2SO_4$ product is not always desirable and it is suggested to recycle the sulfuric acid to an upstream Claus reaction furnace or the $H_2S$ oxidation step as described above. However, the recycling of sulfuric acid is merely thought as an abatement of sulfuric acid, and the consequences of recycling the $H_2SO_4$ on the wet sulfuric acid process or the Claus process have not been evaluated, i.e. it is not recognized that $H_2SO_4$ recirculation requires a reduction in the amount of $O_2$ directed to the Claus reaction furnace, nor are the beneficial effects on the Claus and sulfuric acid process realized.

In WO 2012/152919 A1 it is also recognized that support fuel may be required in both the Claus reaction furnace and $H_2S$ oxidation step to obtain the desired operating temperature, without realizing the beneficial effects of using feedstock gases as support fuel for the $H_2S$ oxidation in the sulfuric acid process.

The proposal to recycle $H_2SO_4$ to the Claus reaction furnace will therefore in itself not provide a working process, but require additional process modifications with regard to both the physical layout/equipment and the process control, availability and safety of the plant.

According to the present invention a process for conversion of $H_2S$ to elemental sulfur with increased efficiency is presented, in which a Claus process is revamped by addition of an integrated sulfuric acid process. According to this process, sulfuric acid produced in the sulfuric acid process, treating the Claus tail gas, is recycled to the Claus reaction furnace for decomposition and elemental sulfur production.

For the purpose of the present application, a stoichiometric amount of oxygen shall be defined under the assumption that the products derived from N, H, C, S and O in the feed gas are $N_2$, $H_2O$, $CO_2$ and $SO_2$. If less than a stoichiometric amount of oxygen is present (also called sub-stoichiometric), this means that not all feed components are fully oxidized. For a Claus gas feed, this means that the process gas after sub-stoichiometric combustion/reaction may contain unconverted $H_2S$, $NH_3$ and hydrocarbons from the feed stream(s) and $H_2$, CO, COS and $CS_2$ formed in the $O_2$ deficit environment.

For the purpose of the present application, a fuel shall be defined as a composition which, when oxidized with $O_2$ will form $N_2$, $H_2O$, $CO_2$ and $SO_2$ as the reaction product and release a substantial amount of energy by the reactions. A mixture of hydrocarbons (e.g. natural gas, with $CH_4$ and $C_2Hs$) as well as $H_2S$ is a typical fuel gas, but the fuel gas could also comprise CO, $NH_3$ and $H_2$.

For the purpose of the present application, oxygen ($O_2$) is understood as a stream containing $O_2$, such as air, enriched air and pure oxygen, but could also be a process gas containing $O_2$.

For the purpose of the present application, a sulfuric acid section is understood a facility for converting a process gas comprising sulfur (such as $H_2S$, $SO_2$, COS, $CS_2$ and elemental sulfur) to sulfuric acid. A sulfuric acid section may be implemented as a catalytic or thermal section oxidizing sulfur species to $SO_2$, followed by a section oxidizing $SO_2$ to $SO_3$, followed by either a condenser providing sulfuric acid by condensing hydrated $SO_3$, or an absorber providing sulfuric acid by absorbing $SO_3$ in sulfuric acid, but other means for production of sulfuric acid such as $H_2O_2$ scrubbers are also known to the skilled person.

For the purpose of the present application, a means for sulfur oxidation shall be understood as any process equipment receiving reduced or elemental sulfur, converting it into $SO_2$. Such means for sulfur oxidation may be a combustor, catalytic equipment or combinations thereof.

For the purpose of the present application pressures indicated in the unit mbarg shall be understood to be gauge pressures relative to atmospheric pressure.

For the purpose of the present application the term "providing" shall be used to cover not only the step of adding physical equipment to a process plant, but also to providing missing elements or re-configuring existing elements to establish the configuration mentioned.

The present invention relates to a revamp process for modifying a sulfur abatement plant comprising a Claus process plant producing elemental sulfur, said Claus process plant comprising a Claus reaction furnace and 1 or more Claus conversion stages, each Claus conversion stage comprising a conversion reactor and a means for elemental sulfur condensation, and a means of Claus tail gas oxidation configured for receiving a tail gas from said Claus process plant and configured for providing an oxidized Claus tail gas, said process revamp comprising the steps of a. providing a sulfuric acid producing tail gas treatment plant producing sulfuric acid, and
b. providing a means for transferring an amount or all of the sulfuric acid produced in said sulfuric acid producing tail gas plant to said Claus reaction furnace characterized in the moles of sulfur in the recycled sulfuric acid relative to the moles of sulfur withdrawn being as elemental sulfur is from 3% or 5% to 15%, 20% or 25%, with the associated benefit of enabling a higher sulfur abatement capacity and/or a higher extent of sulfur removal, while producing elemental sulfur, which is a product of value which may be handled with few safety restrictions, compared to e.g. sulfuric acid, while avoiding excessive use of support fuel due to evaporation of sulfuric acid in the Claus reaction furnace.

In a further embodiment the concentrated sulfuric acid contains from 90% w/w to 98% w/w or 98.5% w/w $H_2SO_4$, with the associated benefit of such concentrated sulfuric acid being sufficiently strong to provide the benefit of providing oxygen to the Claus process, while avoiding or reducing the requirement of support fuel for evaporation of the sulfuric acid.

In a further embodiment the revamp process further comprises the step of limiting the number of Claus conversion stages to two if the Claus process plant comprises more than two Claus conversion stages, with the associated benefit of 2 Claus process stages giving a high conversion at low equipment cost and pressure loss.

In a further embodiment step (a) involves providing a sulfuric acid producing tail gas treatment plant comprising a catalytic $SO_2$ converter, comprising a material catalytically active in oxidation of $SO_2$ to $SO_3$, configured for receiving said oxidized Claus tail gas and configured for providing an $SO_2$ converter off gas to a sulfuric acid unit, being configured for producing concentrated sulfuric acid either by condensation of hydrated $SO_3$ or by absorption of $SO_3$ in sulfuric acid, with the associated benefit of a sulfuric acid process with $SO_2$ to $SO_3$ oxidation having a high sulfur removal efficiency while being cost effective, and producing concentrated sulfuric acid which provides increased thermal efficiency in the Claus reaction furnace, as less water must be evaporated. A condensation based process is preferred over an absorption based process, since an absorption based process requires removal of water from the Claus process gas, to ensure a high concentration of sulfuric acid.

In a further embodiment the revamp process further comprises the step of providing a means for temporary storing sulfuric acid produced in said sulfuric acid producing tail gas treatment plant, having a volume corresponding to the amount of sulfuric acid produced in said sulfuric acid producing tail gas treatment plant in from 4 hours, 8 hours or 24 hours to 50 hours or 120 hours production, wherein said means for storing sulfuric acid is configured for receiving sulfuric acid from said sulfuric acid producing tail gas treatment plant and for directing sulfuric acid to said Claus reaction furnace, with the associated benefit of such an acid tank allowing stable operation of the sulfur abatement plant in the event that sulfuric acid injection nozzles must be replaced, while keeping the investment in equipment low.

In a further embodiment a means for flow control, user-configurable for allowing the outlet from said means of Claus tail gas oxidation to by-pass said sulfuric acid producing tail gas treatment plant is provided, with the associated benefit of allowing operation of the sulfur abatement plant, without release of $H_2S$ in the event that the sulfuric acid producing tail gas treatment plant is out of operation.

In a further embodiment a means for catalytic oxidation of at least an amount of said Claus process tail gas is provided with the associated benefit of catalytic oxidation of the Claus process tail gas being more energy efficient than thermal incineration of the Claus process tail gas, as the catalytic oxidation can be carried out in the temperature range 200-500° C., saving significant amounts of support fuel compared to the thermal incineration taking place at 850-1000° C.

In a further embodiment said means for catalytic oxidation is configured for receiving at least an amount of the Claus process tail gas and in combination with one or more of an oxidant, a heated gas a recycled process gas and a heat exchanger, such that the temperature at the inlet of the means of catalytic oxidation is above 200° C. and the temperature at the outlet of the means of catalytic oxidation is below 500° C., with the associated benefit of this inlet temperature being suited for catalytic oxidation, and furthermore being possible obtain from mixing of available gas streams with little or no addition of thermal energy.

In a further embodiment said Claus reaction furnace is provided with one or more inlet nozzles configured for atomizing the recycled sulfuric acid to a droplet size distribution, in which 90% of the mass of droplets are smaller than 500 µm, with the associated benefit of this droplet size allowing for evaporation within the typical size of a Claus reaction furnace.

In a further embodiment said inlet nozzles are pressure nozzles or two phase nozzles, with the associated benefit of such nozzle types being well suited for providing small droplets.

In a further embodiment said inlet nozzles are positioned in a distance downstream the gas inlet of the Claus reaction furnace, corresponding to at least 1 second residence time of the process gas, with the associated benefit of maintaining the flame temperature of the Claus reaction furnace while also evaporating sulfuric acid.

In a further embodiment said Claus reaction furnace is extended by a volume providing an increase of residence time of the process gas of at least 1 second, with the associated benefit of the increased residence time ensuring complete evaporation of sulfuric acid droplets.

In a further embodiment the Claus reaction furnace is provided with a means for impaction, such as a checker wall or a bed of filler material, with the associated benefit of destroying droplets by collision, to ensure absence of liquid $H_2SO_4$ in the Claus converter feed gas.

In a further embodiment the Claus reaction furnace is provided with a means for turbulence enhancement, such as a vector wall, a choke ring or an inlet tangential to Claus reaction furnace, with the associated benefit of narrowing the residence time, temperature and gas composition distribution in the Claus reaction furnace.

In a further embodiment the control scheme for the amount of oxygen directed to the Claus reaction furnace is modified to be dependent on a combination of feed forward control based on the amount and composition of feedstock and sulfuric acid and feedback control based on the ratio of $H_2S$ to $SO_2$ in the inlet stream to the final Claus conversion stage or the outlet stream from the final Claus conversion stage, with the associated benefit of such a control scheme taking the oxidant contribution of sulfuric acid into consideration.

In a further embodiment the outlet from the Claus reaction furnace is directed to an $SO_3$ guard, absorbing or converting $SO_3$, wherein said $SO_3$ guard material active in $SO_3$ removal ensures a long operation of the catalyst active in the Claus reaction, if droplets of sulfuric acid are not fully evaporated and reduced in the gas phase, such that long operation of the Claus process plant can be maintained.

The present disclosure relates to a way of implementing a process for production of sulfur from a feedstock gas comprising from 15%, 30 vol %, 40 vol % or 50% to 99 vol % or 100 vol % $H_2S$ and a recycled stream of sulfuric acid which may involve one or more of the steps of
  a. providing a Claus reaction furnace feed stream comprising said feedstock gas, an amount of recycled sulfuric acid, an amount of oxygen and optionally an amount of fuel, wherein the amount of oxygen is substoichiometric,
  b. directing said Claus reaction furnace feed stream to a Claus reaction furnace operating at elevated temperature, such as above 900° C., providing a Claus converter feed gas
  c. cooling said Claus converter feed gas and optionally withdrawing elemental sulfur from the gas
  d. directing said cooled Claus converter feed gas to contact a material catalytically active in the Claus reaction,
  e. withdrawing a Claus tail gas and elementary sulfur, optionally by cooling the effluent from said material catalytically active in the Claus reaction,
  f. directing a stream comprising said Claus tail gas, oxygen, and a fuel, as a feedstock gas to a Claus tail gas combustor operating at a temperature above 900° C. or a catalytic means for oxidation, providing an $SO_2$ rich converter feed gas,
  g. cooling said $SO_2$ rich converter feed gas, providing a cooled $SO_2$ converter feed gas
  h. directing said $SO_2$ converter feed gas to contact a material catalytically active in $SO_2$ oxidation to $SO_3$, providing an $SO_3$ rich gas,
  i. converting said $SO_3$ rich gas to concentrated sulfuric acid, either by absorption of $SO_3$ in sulfuric acid or by hydration of $SO_3$, cooling and condensation of sulfuric acid,
  wherein said recycled stream of sulfuric acid comprises an amount of said concentrated sulfuric acid, with the associated benefit of such a process having a high conversion and thermal efficiency and avoiding undesired formation of sulfuric acid. The use of a Claus reaction furnace and a Claus tail gas combustor operating above 900° C. has the effect of ensuring complete conversion of the constituents present, and this may optionally require the presence of a fuel in addition to the feedstock gas. In addition, homogeneous Claus reactions will take place in the Claus reaction furnace, such that elemental sulfur may be withdrawn when the Claus converter feed gas is cooled. The stream fed to the Claus tail gas combustor may typically include $H_2S$ as fuel from the Claus tail gas and/or a separate stream comprising $H_2S$, hydrocarbon or other fuels. In addition to the mentioned process steps the process may include further steps such as heat exchange for changing the temperature (or in other ways conditioning the process streams) to an appropriate range for the processes occurring. Further aspects of the disclosure may however, involve other aspects of the individual steps, as the present disclosure is focused on the implementation of this and similar processes in existing process plants by revamping.

In a further embodiment the Claus reaction furnace feedstock gas comprises less than 0.1 vol % non-elemental nitrogen, such as $NH_3$, with the associated benefit of avoiding formation of e.g. ammonia salts which may plug the Claus condenser(s).

In a further embodiment the Claus reaction furnace feed stream comprises less than 50%, 20%, 10% or 1% elemental nitrogen with the associated benefit of providing a process with a high temperature in the Claus reaction furnace, and a reduced process gas volume, due to the reduced presence of $N_2$. This can be accomplished by using pure $O_2$ or oxygen enriched air as the oxygen source.

In a further embodiment the $H_2S:SO_2$ ratio of said Claus converter feed gas is below 4:1, 3:1 or 2:1, with the associated benefit of such a feed gas providing a $H_2S$ containing Claus tail gas to the Claus tail gas combustor, minimizing the need for fuel gas addition as the $H_2S$ oxidation releases a substantial amount of energy, whereas $SO_2$ does not release energy in the Claus tail gas incinerator.

In a further embodiment, the $H_2S:SO_2$ ratio of said Claus converter gas is below 1.6:1, 1.8:1 or 2:1, with the associated benefit of having a substantially $H_2S$ free Claus tail gas. In the downstream sulfuric acid plant this can be an advantage as the $SO_2$ will not oxidize without a $SO_2$ conversion catalyst and thus it will be possible to preheat the Claus tail gas with a combination of catalytic $H_2S$ oxidation (controlled bypass of feedstock gas containing $H_2S$) and process gas recycle around the catalytic $H_2S$ oxidation, such that the temperature increase across the $H_2S$ oxidation catalyst can be closely controlled. With unknown and/or varying $H_2S$ concentration in the Claus tail gas, the risk of overheating the $H_2S$ oxidation catalyst is high.

In a further embodiment the process further comprises the step of directing an amount of a further feedstock gas to said Claus tail gas combustor, with the associated benefit of providing additional sulfur and fuel to the sulfuric acid process. The further feedstock gas may comprise impurities, which may be incinerated prior to the treatment in the sulfuric acid process, and/or hydrogen sulfide and other fuels which may contribute to the sulfuric acid production and the combustion in the Claus tail gas combustor. If the further feedstock gas comprises a high amount of inert gases or sulfur free fuels, the process also has the benefit of avoiding an increase in Claus converter size due to a non-contributing flow. The further feedstock gas may originate from the same source as the feedstock gas or it may originate from a different source.

In a further embodiment said further feedstock gas comprises more than 5 vol % nonelemental nitrogen, such as ammonia, with the associated benefit of enabling a process where the non-elemental nitrogen constituents, which may be difficult to oxidize in the sub-stoichiometric atmosphere of the Claus reaction furnace, can be directed to the Claus tail gas combustor. Such a process may be especially beneficial if the further feedstock gas is a sour water stripper (SWS) gas comprising $H_2S$, $NH_3$ and $H_2O$-of which only $H_2S$ is desired in the Claus process, and $NH_3$ is problematic in the Claus process due to potential plugging by ammonia salt. Instead such an SWS gas may be directed to the sulfuric acid plant, where it is well known to handle $NH_3$.

In a further embodiment the amount of sulfur in the further feedstock gas is at least 1%, 2% or 5% of the total amount of elemental sulfur withdrawn from the process, with the associated benefit of such a feedstock gas being able to provide thermal energy while also contributing to the sulfur abatement.

In a further embodiment the material catalytically active in the Claus reaction comprises activated aluminum(III) oxide or titanium(IV) oxide with the associated benefit of such a material providing an efficient process for production of elemental sulfur.

In a further embodiment step (d) is carried out under a pressure of 200 mbarg to 700 mbarg, a temperature of 200° C. to 350° C. and a space velocity of 800 Nm³/h/m³ to 3000 Nm³/h/m³, with the associated benefit of such conditions being efficient for the production of elemental sulfur.

In a further embodiment step (d) is carried out at a temperature of 100° C. to 150° C. and step (e) involves the step of periodically heating said material catalytically active in the Claus reaction to allow withdrawal of condensed elemental sulfur in a liquid or gas phase, with the associated benefit of the low temperature being beneficial for achieving very high conversion of $SO_2$ and $H_2S$ into elemental sulfur, both due to a favorable equilibrium at the low temperature but due to a shifting of equilibrium by removing the reaction product.

In a further embodiment said material catalytically active in conversion of $SO_2$ to $SO_3$ comprises vanadium, with the associated benefit of such a material providing an efficient process for production of sulfuric acid.

In a further embodiment said step (h) is carried out under a pressure of 50 mbarg to 200 mbarg, a temperature of 380° C. to 520° C. and a space velocity of 800 Nm³/h/m³ to 1500 Nm³/h/m³, per catalyst bed, with the associated benefit of such conditions being efficient for the oxidation of $SO_2$ to form $SO_3$. In a further embodiment the amount of sulfur in the recycled stream of sulfuric acid is higher than 1%, 3% or 5% and less than 17%, 21% or 25% of the total amount of elemental sulfur withdrawn from the process. A recycle above the lower limits has the benefit of providing the effect of reduced process gas volume, while the recycle being less than the upper limits avoids a situation where additional fuel must be added to the Claus reaction furnace, resulting in extra process volume and operational cost.

In a further embodiment the concentration of said sulfuric acid is at least 80 w/w % or 90 w/w %, with the associated benefit of such acid providing an addition oxidant in the form of $O_2$ released from $H_2SO_4$ to the Claus process, while minimizing the amount of water which must be evaporated in the Claus reaction furnace.

In a further embodiment the sulfuric acid in the recycled stream of sulfuric acid is atomized in said Claus reaction furnace using compressed air or pressure nozzles and wherein the residence time in the Claus reaction furnace is at least 0.5 seconds, 1 second or 1.5 seconds, with the associated benefit of such residence times being sufficient for complete evaporation of the sulfuric acid droplets.

In a further embodiment the molar ratio $H_2S:O_2$ of the components directed to the Claus reaction furnace is at least 2.5, with the associated benefit of such a low oxygen feed enabling sub-stoichiometric partial conversion of $H_2S$ to $SO_2$, from the contribution from thermal dissociation of $H_2SO_4$, adding the remaining $O_2$ to obtain the desired $H_2S:SO_2$ ratio of 2.0 in the Claus tail gas.

In a further embodiment an amount of said sulfuric acid is from a source other than a Claus tail gas treatment plant, with the associated benefit of providing addition conversion of sulfuric acid to elemental sulfur.

In a further embodiment an amount of SWS gas comprising 20-50% $NH_3$, 20-50% $H_2S$ and at least 80% of the balance being $H_2O$, is directed as an additional feedstock to one or more of said Claus reaction furnace and said Claus tail gas treatment In a further embodiment an amount of gas in the process is cooled and directed to an upstream position for controlling the process temperature, with the associated benefit of enabling active control of the temperature of the highly exothermic processes.

In a further embodiment one or more streams directed to said Claus reaction furnace are pre-heated by heat exchange with a hot process stream, with the associated benefit of minimizing or avoiding the requirements for support fuel to achieve the desired temperature for evaporation of sulfuric acid and conversion of the feedstock.

In a further embodiment one or more streams directed to said Claus tail gas combustor are pre-heated by heat exchange with a hot process stream with the associated benefit of minimizing or avoiding the requirements for support fuel to achieve the desired temperature for combustion and subsequent oxidation of $SO_2$.

In a further embodiment at least one of said catalytically active materials for oxidation of $SO_2$ to $SO_3$ or $H_2S$ to elemental sulfur and/or at least one product withdrawn from one of said catalytically active materials are cooled by heat exchange, such as interbed heat exchange or an internally cooled catalytic reactor, with the associated benefit of enabling active control of the temperature of the highly exothermic processes by interbed heat exchange or an internally cooled catalytic reactor such as a boiling water reactor, having a tubular or a thermoplate cooling circuit.

The present invention describes a revamp of a Claus with a sulfuric acid process, which effectively can produce the amount of sulfuric acid required by a process plant or even avoid production of sulfuric acid and convert excess sulfuric acid to elemental sulfur which may be transported to other sites.

For maximum conversion to elemental sulfur ⅓ of the $H_2S$ must be converted to $SO_2$.

$$H_2S+1.5O_2 \rightarrow SO_2+H_2O \quad (1)$$

The stoichiometric ratio between $H_2S$ and $SO_2$ is controlled by controlling the amount of oxygen in the Claus reaction furnace. Oxygen is typically supplied by atmospheric air, but can also be $O_2$ enriched air or even pure $O_2$.

The oxygen addition to the Claus reaction furnace must also take into account the amounts of $NH_3$, CO, $H_2$ and hydrocarbons in the feed streams.

If the combustion temperature in Claus reaction furnace is less than 1100° C. the conversion of e.g. $NH_3$ may be incomplete. The consequence of this will be a Claus converter feed gas having a potential for formation of ammonia salts, such as $(NH_4)_2SO_4$ and $(NH_4)_2S_2O_3$ which may plug the Claus condenser.

The partially oxidized Claus converter feed gas is then converted to elemental sulfur by the following reactions at a temperature typically above 200° C. in the presence of a catalytically active material, such as activated aluminum(II) oxide or titanium(IV) oxide.

$$2H_2S+SO_2 \rightarrow \tfrac{3}{8}S_8+2H_2O \quad (2)$$

Often 3-4 Claus converters are operated in series, to increase the conversion to a maximum, which will increase the cost of a Claus plant.

The control of temperature in the Claus process is important to ensure that elemental sulfur formed in catalytic converter remains gaseous until the desired process position for condensation. a further restriction is related to the fact that as the Claus process is exothermic it is beneficial to operate at low temperatures.

An alternative to the above process is the so-called sub-dewpoint Claus process, in which the material catalytically active operates at temperatures where elemental sulfur is not on the gas phase. Such a sub-dewpoint Claus process will require an appropriate scheme for withdrawal of condensed elemental sulfur, e.g. by pulsing of the temperature and purging of elemental sulfur by an inert gas.

Even with 3-4 Claus converters/condensers/reheaters in series it is not possible to reach more than ~98% sulfur recovery, which is insufficient to comply with most environmental legislations. Therefore, the Claus plant is typically equipped with a so-called Claus tail gas solution, where the above mentioned sub-dewpoint process is an example. Numerous tail gas processes exist, having different features. To achieve very high removal efficiencies these Claus tail gas plants become complicated and approach the same cost as the Claus plant itself.

The produced elemental sulfur, does typically not have a direct use in the plants producing the H$_2$S containing waste stream, but elemental sulfur is simple to transport to other sites and to store for prolonged periods.

A common alternative to the Claus process is the conversion of H$_2$S to sulfuric acid, e.g. by the so-called Wet Sulfuric Acid process. The sulfuric acid produced may be used in other chemical processes in the plant. A wet sulfuric acid process may also constitute the tail gas cleaning of a Claus process plant. A similar dry sulfuric acid process may also find use in this relation.

The sulfuric acid processes oxidize H$_2$S to SO$_2$ and the SO$_2$ into SO$_3$ and subsequently hydrate SO$_3$ into sulfuric acid, either by reaction with water in the gas phase in the so-called wet sulfuric acid process or by absorption in concentrated sulfuric acid in the so-called contact process or dry process. The reaction temperature during oxidation of SO$_2$ to SO$_3$ will be in the range 400-500° C., in the presence of a catalytically active material, typically comprising vanadium. Typically, the wet sulfuric acid processes produce sulfuric acid having a concentration in the range 92%-98%, whereas dry sulfuric acid processes may also produce sulfuric acid having a concentration in excess of 98%.

In addition, it may also be attractive to collect hot high pressure steam in the range from 30 barg to 80 barg from the highly exothermic sulfuric acid processes, whereas the Claus process will only provide steam of lower pressure and in significantly lower amounts. This high temperature/high pressure steam will allow for efficient thermal integration in the process, e.g. by pre-heating of process gas.

Production of large amounts of sulfuric acid may, however, be less attractive, even though sulfuric acid is traded commercially, as transport of sulfuric acid is complex and regulated.

The reactions taking place in a sulfuric acid process (dry and wet) are $$H_2S+1.5O_2 \rightarrow SO_2+H_2O \quad (3)$$

$$SO_2+0.5O_2 \rightarrow SO_3 \quad (4)$$

$$SO_3+H_2O \rightarrow H_2SO_4 \quad (5)$$

The overall reaction of the sulfuric acid process can be described according to $$H_2S+2O_2 \rightarrow H_2SO_4 \quad (6)$$

The wet sulfuric acid process as an ordinary Claus tail gas revamp solution provides a solution that fulfills the environmental regulations at both lower capital and operating cost than the alternatives. The only disadvantage of the wet sulfuric acid process, so far, has been the sulfuric acid product that is not always desirable. With the new invention, an integrated Claus process revamped by addition of a sulfuric acid process will remove this disadvantage, and at the same time increase the capacity of the Claus plant.

It has now been realized that the revamp of an existing Claus process plant by addition of a wet sulfuric acid process may beneficially be carried out by recycle of all or substantially all produced sulfuric acid to the Claus reaction furnace. An integrated Claus/wet sulfuric acid process according to the present disclosure may remove the disadvantage of an inconvenient sulfuric acid product, and at the same time reduce plant size of both the Claus and wet sulfuric acid process.

Combustion of sulfuric acid is known from regeneration of spent sulfuric acid in a wet sulfuric acid plant, but has not been practiced in the reaction furnace of the Claus process or under Claus process conditions.

When the sulfuric acid is injected into the sulfuric acid evaporation zone the following overall reaction takes place $$H_2SO_4+3H_2S \rightarrow 2S_2+4H_2O \quad (7)$$

To complete this overall reaction, the following reactions have to be completed:

$$H_2SO_4(liquid) \rightarrow H_2SO_4(gas) \quad (8)$$

$$H_2SO_4(gas) \rightarrow H_2O(gas)+SO_3(gas) \quad (9)$$

$$SO_3(gas) \rightarrow SO_2(gas)+0.5O_2(gas) \quad (10)$$

Reaction (8) is a common evaporation reaction, in which energy required for heating up the liquid and evaporating water and sulfuric acid is supplied by the hot surrounding process gas. An effect of full evaporation of sulfuric acid is that gaseous H$_2$SO$_4$ is far less corrosive than liquid H$_2$SO$_4$ droplets.

Reaction (9) is an endothermal dissociation reaction, which occurs almost instantaneously at temperatures above 600° C. At this point some SO$_3$ will start reacting with H$_2$S to form SO$_2$, H$_2$O and elemental sulfur.

Reaction (10) is an endothermal decomposition reaction, which is rapid at temperatures above 900° C. In oxygen rich atmospheres, chemical equilibrium prevents complete dissociation, but in reducing atmospheres, the removal of the O$_2$ product (by reaction with H$_2$S) will allow for complete decomposition. The reaction between H$_2$S and O$_2$ is very fast at these elevated temperatures.

As the residence time in a sulfuric acid evaporation zone is typically 1-2 seconds, it must be assured that the reactions 8, 9, 10 and 1 are completed within this time. When the process gas is cooled, i.e. in the Claus waste heat boiler, the reaction rates dramatically decrease and further conversion will be insignificant.

Presence of O$_2$ and/or SO$_3$ in the process gas contacting the catalyst in the downstream Claus reactors will lead to deactivation of the catalyst due to "sulfation" reaction, where catalytically active aluminum oxide or titanium oxide is converted into catalytically inactive aluminum sulfate or titanium sulfate and thus elemental sulfur formation in these reactors will decrease, leading to an increase in unconverted sulfur species to the downstream tail gas sulfuric acid plant and increased emissions to the atmosphere.

Furthermore, SO$_3$ in the process gas can, during passage through the sulfur condensation units, combine with water and condense and form sulfuric acid in the elemental sulfur product, which can lead to corrosion of process equipment.

To eliminate the risk of any unconverted SO$_3$ from the sulfuric acid evaporation zone causing operational problems in the Claus converters and elemental sulfur condensers, a catalytic reactor can preferably be installed between the outlet of the waste heat boiler and the first elemental sulfur condenser or first catalytic Claus reactor. The catalyst is effective in reducing the content of $SO_3$ to harmless $SO_2$ and/or elemental sulfur by the $H_2S$ and $H_2$ present in the reaction furnace off gas.

If all sulfuric acid produced in the Claus tail gas sulfuric acid process is directed to the Claus reaction furnace, it is possible to operate a Claus process in which the $H_2S$ abatement employs the very high removal efficiency as well as thermal efficiency of the sulfuric acid plant, but in which the only product is elemental sulfur, which is simple to handle and transport.

In addition, by the recycle of sulfuric acid, $O_2$ is released by the decomposition of $H_2SO_4$, such that the amount of added combustion oxidant will be reduced, which, if the oxidant is atmospheric air, has the benefit of reducing the process volume dramatically, since atmospheric air comprises close to 80% inert $N_2$, i.e. 4 volumes of $N_2$ per volume of $O_2$.

The overall Claus reaction, based on air as $O_2$ carrier to the Claus reaction furnace is:

$$4H_2S+2O_2+8N_2 \rightarrow 2S_2+4H_2O+8N_2 \qquad (11)$$

Similarly, the overall Claus reaction, based on $H_2SO_4$ as the $O_2$ carrier to the Claus reaction furnace is:

$$3H_2S+H_2SO_4 \rightarrow 2S_2+4H_2O \qquad (12)$$

Comparing the two reactions, it is evident that $H_2SO_4$ is an excellent $O_2$ carrier and has the (theoretical) potential to reduce the Claus tail gas volume flow by 67% compared to atmospheric air.

It may also be beneficial to by-pass an amount of feedstock gas to the Claus tail gas combustor, since the feedstock gas has a calorific value, which may be used in the Claus tail gas combustor, and thus reduce the requirement for addition of support fuel. This may be even more beneficial if two sources of feedstock gas exist, such that one feedstock gas free of $NH_3$ and another feedstock gas containing $NH_3$, since the substoichiometric conditions in the reaction furnace zone impedes complete oxidation of $NH_3$. So-called Sour Water Stripper (SWS) gases, comprising mainly $NH_3$, $H_2S$ and $H_2O$, in similar amounts, is an example of such an $NH_3$ containing feed stock gas.

In Claus processes for treatment of SWS gas, the complete destruction of $NH_3$ in the Claus reaction furnace is desired, since otherwise ammonia salts such as $(NH_4)_2SO_4$ and $(NH_4)_2S_2O_3$ may form and plug the final elemental sulfur condenser. Special high intensity (two-stage) burners are able to reach the high temperatures needed for thermal $NH_3$ destruction, but require accurate control of sour gas in two separate streams.

However, it is well known to treat SWS gas in a sulfuric acid plant, since complete oxidation of $NH_3$ to $N_2$ and NO is obtained with excess oxygen at temperature around 1000° C. Therefore, it may be desirable to configure an integrated Claus/sulfuric acid process with two thermal stages for directing a first feedstock comprising $H_2S$ and little or no $NH_3$ to the Claus reaction furnace while directing gas comprising $NH_3$, such as SWS gas, to the Claus tail gas incinerator. In such a configuration it may be desirable to design the sulfuric acid plant to include a section for selective catalytic reduction (SCR) of $NO_x$ by $NH_3$ in the presence of a vanadium based catalyst.

When designing a Claus burner and reaction furnace, the destruction of hydrocarbons (e.g. $CH_4$ and BTX) and, if present, $NH_3$ typically determines the operating temperature and residence time. Breakthrough of these species to the catalytic Claus section could result in catalyst fouling and deactivation and plugging of elemental sulfur condensers, leading to unplanned shutdowns.

The reactions considering $H_2S$ (reaction 1 and 2) are generally considered fast and will not be rate determining reactions.

As a rule of thumb, a temperature of 1000-1050° C. is required for complete destruction of hydrocarbons, taking into account the effects of slow mixing and temperature/composition gradients. Similarly, 1200-1250° C. is required to ensure proper destruction of $NH_3$ in the reaction furnace.

To reach such high temperatures, especially in the case with feed gases with low caloric value a selection of feed gas preheating, oxygen enrichment, sour gas staging and/or fuel gas co-firing may be required.

In e.g. refineries, there will typically be a concentrated sour gas (>80 vol % $H_2S$) and a $NH_3$ and $H_2S$ containing gas (sour water stripper (SWS) gas, comprising 20-50% $NH_3$, 20-50% $H_2S$ and at least 80% of the balance as $H_2O$, in similar amounts), where the majority of the sulfur input is present in the sour gas. The reaction furnace zone may then be configured to accept the entire amount of SWS gas and combustion air and an amount of sour gas, such that the reaction furnace zone temperature will be around 1200-1250° C. and complete $NH_3$ destruction is achieved before the sulfuric acid addition, where the sulfuric acid, any atomization media and remaining sour gas is injected.

In natural gas processing plants, the feed stock gas to the Claus plant will be less concentrated in $H_2S$ (typically <60 vol %) and will contain hydrocarbons, which require a temperature higher than 1000-1050° C. to ensure complete destruction of the hydrocarbons. In such situation, the preferred option would most likely be to direct the entire amount of sour gas into the reaction furnace zone.

An integrated process may also benefit from the use of oxygen enriched air or substantially pure oxygen in the Claus reaction furnace. The use of oxygen enriched air has the benefit of reducing the amount of inert nitrogen in the process gas, and thus reducing the process gas volume and thus reduce plant size. The absence of dilution by nitrogen also has the effect of increasing the combustion temperature, which may be beneficial if impurities are present which need complete conversion, especially since the amount of oxygen in the Claus reaction furnace is sub-stoichiometric. Since the Claus catalyst is sensitive to presence of impurities, such as light hydrocarbons it may often be beneficial to operate the Claus reaction furnace with oxygen enriched air to achieve an elevated temperature for complete oxidation of impurities. This also has the further benefit of enabling an initial homogeneous non-catalytic Claus conversion, which may take place at temperatures above 900° C.

From a thermal efficiency perspective, the high combustion temperature may however be limited by the choices of construction materials in the Claus reaction furnace and downstream waste heat boiler. For highly concentrated $H_2S$ feed gases, oxygen enrichment may increase the process gas temperature above the design temperatures for the materials. A combination of $H_2SO_4$ recycle (which cools the process gas by evaporation and acid decomposition) will however make use of enriched $O_2$ in such a layout possible.

The Claus tail gas combustor will typically be operated with atmospheric air, and in addition it may also be beneficial to direct gases with a low concentration of sulfur species to the Claus tail gas combustor as complete combustion of the sulfur species release considerably more energy than the partial oxidation taking place in the Claus reaction furnace.

As a consequence, it may be beneficial to direct feedstock gases comprising high concentrations of $H_2S$ to the Claus plant, while by-passing the less concentrated feedstock gases as well as feedstock gases comprising $NH_3$ to the Claus tail gas combustor.

One example could be where the feedstock gases to the sulfur abatement plant are a sour gas highly concentrated in $H_2S$ and a SWS gas comprising $NH_3$. Here the sulfuric acid plant may be configured to receive the entire amount of SWS gas, thus saving fuel in the Claus tail gas combustor and eliminates operational issues in the Claus plant, related to incomplete destruction of the $NH_3$ in the Claus reaction furnace.

If the Claus tail gas combustor only receives a Claus tail gas comprising only a limited amount of $H_2S$, the calorific value is too low to sustain a stable combustion. In that situation addition of a support fuel is required. This support fuel may either be $H_2S$, SWS gas or a hydrocarbon feed, but preferably an amount of an existing feedstock gas to the integrated Claus and sulfuric acid plant is used.

The integration between the Claus process and the sulfuric acid process allows for integration benefits. These include the possibility to reduce the volumetric flow in the Claus process, by providing oxidant in the form of sulfuric acid, which can replace atmospheric air. In addition, the use of feedstock gas may be optimized such that feedstock gases comprising fuels contributing highly to elemental sulfur production may be directed to the Claus process, whereas feedstock gases contributing with thermal energy and non-reacting products such as $CO_2$ may be directed to the sulfuric acid process. Where the process is designed for recycle of a too high amount of sulfuric acid, additional fuel may be required for providing the heat required for evaporation and dissociation of sulfuric acid.

In a preferred embodiment, the sulfuric acid produced in the Claus tail gas sulfuric acid plant is cooled and directed to an intermediate storage tank. In principle the sulfuric acid storage tank can be omitted as the Claus reaction furnace is designed to accept the entire sulfuric acid production from the sulfuric acid plant. However, in order to ensure high reliability of the overall plant, the installation of the tank allows for (short time) operation of the Claus plant without sulfuric acid injection while the sulfuric acid plant is still in operation. Such situations can arise during start-up and shut-down and if maintenance of the sulfuric acid lances/nozzles is required. The tank will also enable withdrawing sulfuric acid product, should this become a desired product and also allow import of sulfuric acid from other sources.

A tank capacity for 1-4 days between 4 hours and 120 hours of sulfuric acid production is a good compromise between tank cost and Claus+Claus tail gas sulfuric acid plant flexibility. The sulfuric acid production will typically be around 0.1 $m^3$ sulfuric acid per ton elemental sulfur produced.

In addition to the wet sulfuric acid process, sulfuric acid can also be produced in other sulfur abatement processes. A first example is the SNOX process in which selective catalytic reduction of $NO_x$ is integrated with the wet sulfuric acid process, this layout being especially favorable for flue gases with less than 1 vol % $SO_2$. Also relevant are $H_2O_2$ scrubbers, which are often favored for small waste gas volumes with low $SO_2$ concentrations, where $SO_2$ is directed to react with $H_2O_2$ directly forming $H_2SO_4$. In addition, dry sulfuric acid processes operating by absorption in sulfuric acid may be considered. Sulfuric acid is also produced in a process where the feed gas enters the reactor and travels up through an activated carbon bed in which the sulfur dioxide is converted to sulfuric acid by wet catalysis in the presence of oxygen and water. Sulfuric acid from all these and other sources may also be beneficial to direct to a Claus reaction furnace.

However, the benefit of the sulfuric acid injection into the Claus reaction furnace decreases as the sulfuric acid concentration decreases, as a consequence of the extra energy required for the evaporation of water and the increase in process gas flow caused by the increased amounts of water in the sulfuric acid feed. Sulfuric acid produced by reaction with $H_2O_2$ and activated carbon processes is typically too low to provide a beneficial integration with the Claus plant.

It may therefore be beneficial that the sulfuric acid produced in the Claus tail gas sulfuric acid plant is further concentrated in an acid concentrator before recycled to the Claus reaction furnace. The operation of such a concentrating plant will require energy to evaporate water from the sulfuric acid, but much of this energy is then saved in the Claus reaction furnace. The benefit of this is a lower decrease in process gas temperature in the sulfuric acid evaporation zone and a decrease of process gas flow through the Claus plant and Claus tail gas plant.

If a sulfuric acid condenser is used, the sulfuric acid concentration could also be increased by reducing the $H_2O$ concentration in the process gas. The Claus tail gas typically contains 25-30 vol % $H_2O$ and reducing the concentration will not only increase the sulfuric acid concentration but also reduce the process gas flow in the sulfuric acid plant significantly. However, the cost of reducing the water concentration in the process gas is very high as the process gas temperature should be decreased to below 50-60° C. to condense most of the water and furthermore the water would be contaminated with elemental sulfur, $H_2S$, $SO_2$ and/or $H_2SO_4$ and would thus require further treatment.

The integration of the two processes also enable a process where the operation of the Claus process is carried out with a low conversion such as 90% or 95%-since it may be cheaper to carry out the additional conversion in a sulfuric acid process compared to the addition of an extra Claus converter stage.

A standard Claus plant layout requires >50 vol % $H_2S$ in the feed gas to be thermally self-sustainable in the Claus reaction furnace. With lower $H_2S$ concentrations, feed gas preheating and so-called split flow configuration is required. Claus plants treating feed gases with <10-20 vol % $H_2S$ are rarely seen. Sulfuric acid processes, on the other hand, very efficiently treat these so-called lean $H_2S$ gases, producing concentrated sulfuric acid. The sulfuric acid product will be highly concentrated in sulfur and oxygen.

A combination of a sulfuric acid plant to treat a lean $H_2S$ (and/or other sulfur compounds) gas in combination with a Claus plant treating a rich $H_2S$ gas and accepting the acid from the sulfuric acid plant will be a beneficial setup as the feed streams to both the Claus plant and sulfuric acid plant are optimal with regard to conversion efficiency, thermal efficiency and plant size/cost.

The revamp of the Claus process by addition of a sulfuric acid process may also be used to optimize the treating of feeds. Sulfuric acid processes and in particular the wet sulfuric acid process has the benefit of being well suited for contaminated feeds, including SWS gases comprising ammonia as discussed above, "dirty sulfur" comprising organic impurities and moderate amounts of inorganic impurities, dilute streams of $H_2S$, $SO_2$ and other sulfur compounds, including flue gases from burners and FCC gas. Similarly, rich $H_2S$ gases, which must be diluted before being treated in a wet sulfuric acid plant, may instead be directed immediately for the Claus process.

A Claus plant may comprise a thermal step and 1-3 catalytic steps in which $H_2S$ reacts with $SO_2$ to form elemental sulfur, which is withdrawn in 1-4 condensers. The sulfur recovery requirement decides the number of catalytic steps, which are required. As a rule of thumb, the accumulative sulfur recovery efficiencies are 60-75% after the thermal step, 85-88% after $1^{st}$ catalytic step, 94-97% after $2^{nd}$ catalytic step and 97-98% after $3^{rd}$ catalytic step. Sulfur recoveries beyond 98% typically requires a so-called Claus Tail gas treatment plant, TGTP, of which more than ten technologies can be chosen, depending on the sulfur recovery demands and cost of the technology.

If a Claus plant requires a revamp or upgrade in order to increase sulfur recovery, capacity and/or lower emissions, the required sulfur recovery to a large extent chooses the technology. For sulfur recoveries of 99.9% and above, the choice has typically been an amine based TGTP in which all sulfur containing species first are reduced to $H_2S$ by reaction with $H_2$, the $H_2S$ is captured in an amine solution and released in a stripping unit and returned to the Claus reaction furnace as a concentrated $H_2S$ gas. The technology is characterized with both high capital cost and high operating cost.

A further alternative is to install a sulfuric acid plant as TGTP. It has recently been identified that such a configuration may benefit from recirculation of the captured sulfur to the Claus reaction furnace in the form of concentrated sulfuric acid. The technology is characterized by increased capacity of the Claus plant and lower capital and operating cost.

Another important factor for choice of TGTP is availability, i.e. that a process trip, i.e. a safety shut down due to operating condition out of bounds, of the TGTP must not result in a shutdown of the Claus plant as this will result in a shutdown of upstream plants, e.g. hydroprocessing plants for desulfurization of fuels. For refineries, such shutdowns of hydroprocessing plants will be very costly and are thus undesired.

Revamping or upgrading the Claus plant with a sulfuric acid plant as TGTP and recycle of sulfuric acid will involve at least some of the following process modifications:

- Removal of process equipment relating to the Claus process downstream the sulfur condenser following the second catalytic Claus converter,
- Evaluation of Claus burner and reaction furnace design with regard to positioning of sulfuric acid injection nozzles without affecting the main flame, possible installation of droplet impaction devices (such as a checker wall) in the Claus reaction furnace etc.
- Update of trip system and control system for the Claus plant
- Design and installation of a new sulfuric acid plant and a sulfuric acid storage tank or integration of an existing sulfuric acid plant.
- Design and installation of sulfuric acid feed system for Claus reaction furnace, such as atomization nozzles, pumps and surveillance of acid feeding system.
- Evaluation of reusing the existing tail gas incinerator and stack
- Evaluation of effect of total plant availability A preferred Claus plant layout for a revamp with a sulfuric acid plant TGTP is a layout with 2 catalytic stages-the sulfur recovery in such a Claus plant is in the range 94-97% and the 3-6% sulfur directed to the sulfuric acid plant is efficiently converted to concentrated sulfuric acid, which can be recirculated to the thermal stage of the Claus plant.

Having 3 catalytic Claus stages will have a high cost impact on the Claus plant but only have a small effect on the size of the sulfuric acid plant and from an operational point of view, the extra pressure loss in the $3^{rd}$ stage and the extra complexity of the Claus plant does not grant a net advantage for the combined Claus+sulfuric acid TGTP.

Having only a single catalytic stage will in most cases be non-optimal if the entire sulfuric acid production in the sulfuric acid TGTP is recycled to the thermal stage of the Claus plant since this would require 12-15% of the sulfur being added to Claus reaction furnace as sulfuric acid, which may make it difficult to operate the thermal stage at the optimal temperature. However, if enriched air and/or fuel gas is used in the firing in the thermal Claus stage, such a layout will be possible.

Environmental regulations with respect to $H_2S$ emissions are extremely strict. Therefore a Claus plant comprises a tail gas incinerator, which will convert the unconverted $H_2S$ to $SO_2$. Depending on local environmental regulations, a tail gas treatment plant may also be installed, which removes $SO_2$ from the tail gas before it is directed to the stack.

The tail gas incinerator is typically designed to treat the Claus tail gases with a composition based on the inlet to the TGTP, allowing for the TGTP plant being bypassed the Claus plant, i.e. the design heating value of the tail gas feed may be higher than normal operation. To minimize fuel gas consumption, the operating temperature is typically 900° C. which will ensure that emissions from the stack are in compliance with environmental legislation. The residence time is typically 1 second. Other incinerators can operate with e.g. lower temperatures (such as 800° C.) and/or longer residence times (up to 10 seconds) and a case-by-case evaluation will be required to assess whether the incinerator can be reused. Reusing the incinerator will greatly reduce cost of the revamp project.

In a wet type sulfuric acid plant treating gases containing $H_2$, $H_2S$, COS, $S_8$ and $CS_2$, the incinerator typically operates at 1,000° C. and with 1 second residence time to ensure full conversion of sulfur containing compounds into $SO_2$. This increase in temperature and possibly residence time would at a first glance be considered to require a replacement of the tail gas incinerator.

However, the evaluation of whether the existing incinerator can be used will include a number of considerations, including of thermal stability of materials, volumetric capacity and residence time.

Typically the increase in temperature from 900° C. to 1000° C. will not be critical for the relevant materials of construction, as the refractory is highly heat resistant.

The increased volumetric requirements due to an increased amount of support fuel in order to reach 1000° C. will only be minor with respect to the volumetric capacity or residence time. In addition, the possibility for recuperation of thermal energy from $SO_2$ oxidation by pre-heating the Claus tail gas will reduce the requirement for support fuel. Finally a detailed analysis of the integrated process has shown that the total process gas flow may be decreased, due to a reduced requirement for combustion air in the Claus reaction furnace. Therefore it is realized that often the tail gas incinerator may be reused in a Claus process plant revamped for operation with recycling of sulfuric acid, from a sulfuric acid tail gas treatment plant.

In conclusion, for most feed streams to the Claus plant, the acid recirculation to decrease Claus tail gas flow, use of preheating the Claus tail gas and combustion air will allow reusing the existing incinerator after revamping the Claus plant with a sulfuric acid plant (refer to FIG. 2).

In the Claus tail gas incinerator, all sulfur compounds will be oxidized to $SO_2$ and a few percent of the $SO_2$ will be further oxidized to $SO_3$. As the heating value of the Claus tail gas is too low to sustain a stable flame, fuel gas addition is required. The fuel gas is typically hydrocarbon based (e.g. natural gas), but could also be feed gases to the upstream Claus plant such as $H_2S$ containing gas and so-called sour water stripper gas, also comprising $NH_3$. Using sour water stripper gas as fuel will generate $NO_x$, which is effectively removed in a SCR reactor, which can be located upstream the $SO_2$ converter. $NH_3$ for the SCR reaction can be supplied from an external storage or it can be taken from the sour water stripper gas.

As the Claus tail gas is $O_2$ free, $O_2$ must be added, typically in the form of atmospheric air.

The off gas from the incinerator is then cooled in one or two steps to reach a temperature of 370-450° C., which is the typical inlet temperature to a $SO_2$ converter, in which $SO_2$ is catalytically converted to $SO_3$ by reaction with $O_2$ in the presence of a catalytically active material comprising vanadium oxide.

It may be necessary to add $O_2$ in the form of atmospheric air upstream the $SO_2$ converter since the existing tail gas incinerator typically is designed to operate with low excess $O_2$ in the off gas. It may therefore not be feasible to add extra air required for downstream oxidation of $SO_2$ to $SO_3$ to the incinerator as it will increase fuel consumption and decrease residence time in the incinerator.

In the $SO_2$ converter 1-3 catalyst layers are installed, with integrated cooling, typically by a heat exchanger positioned below each layer is to remove heat of reaction and control the inlet temperature to the next catalyst layer. These inter-bed heat exchangers typically use high pressure steam as cooling media, but high pressure water, molten heat transfer salt, process gas and air can also be used. The $SO_2$ oxidation catalyst is vanadium based. The $SO_2$ conversion efficiency in the $SO_2$ converter is typically above 99%, ensuring more than 99.9% total sulfur removal from the feed gases.

The $SO_2$ converter off gas is cooled and directed to a sulfuric acid condenser in which the gas is further cooled, $SO_3$ reacts with $H_2O$ to form $H_2SO_4$ and condenses as concentrated sulfuric acid with a concentration in the range 90-98% w/w. The hot concentrated sulfuric acid is withdrawn from the condenser, cooled in a recirculation loop and pumped to the storage tank. From there it can be recirculated to the Claus plant and injected into the Claus reaction furnace for evaporation and decomposition and formation of elemental sulfur.

The cooled gas leaving the sulfuric acid condenser is substantially free of sulfuric acid and can be directed to the stack, which often may be the existing stack.

The cooling media in the sulfuric acid condenser is atmospheric air, which indirectly receives heat from the process gas, by heat exchange through a glass wall, typically a tube. The cooling air can be either on the inside or outside of the tube and will leave the condenser at a temperature between 180° C. and 270° C. A part of the hot air can be used as combustion air in the incinerator and/or added upstream the $SO_2$ converter to provide $O_2$ for the $SO_2$ oxidation.

If the conclusion is that the existing incinerator for some reason cannot be reused with the just described standard sulfuric acid plant layout (refer to FIG. 2), a semi-catalytic sulfuric acid plant layout can be applied (refer to FIG. 3).

In an alternative semi-catalytic sulfuric acid plant layout, the Claus tail gas may optionally be preheated and divided just upstream the existing incinerator: a fraction is directed to the incinerator for thermal destruction of the sulfur containing compounds (and $H_2$ and CO) and the other fraction is bypassed the incinerator and mixed with the hot incinerator off gas. With this layout there will be no problems with regard to obtaining the desired temperature and residence time in the incinerator and in fact there will be a significant reduction in fuel gas consumption compared to the normal operation of the incinerator treating the entire Claus tail gas.

The 900-1,000° C. off gas from the incinerator is mixed with the preheated Claus tail gas, producing a semi-oxidized process gas with $H_2S$, $S_3$, COS, $CS_2$, CO and $H_2$ from the Claus tail gas, but with a lower concentration and higher temperature due to the dilution with the hot incinerator off gas. The mixing temperature is typically in the 400-750° C. range and at this temperature, $H_2S$ and $CS_2$ will become readily oxidized by gas phase reactions. The remaining COS, CO, $H_2$ will require catalytic oxidation and thus the semi-oxidized process gas must be cooled to the optimal oxidation catalyst temperature. The gas cooling can be carried out using e.g. a steam generating waste heat boiler, a steam super heater, a gas/gas heat exchanger or any other heat exchanger alone or in combination.

The catalytic oxidation of $H_2$, COS, $CS_2$ and CO is carried out using a noble metal doped catalyst, which must be resistant to sulfur compounds. Such a catalyst is e.g. described in EP 2878358, and will typically comprise V, Ti and Pd.

The temperature increase in the catalytic oxidation reactor will preferably bring the process gas temperature to the desired value at the inlet to the downstream $SO_2$ converter and $SO_2$ oxidation catalyst, typically in the range 370-450° C. The temperature increase in the catalytic oxidation reactor may be controlled by the fraction of Claus tail gas bypassing the incinerator and/or the degree of heat removal in the heat exchanger(s) between the incinerator outlet and catalytic oxidation reactor inlet.

In the $SO_2$ converter, one or more catalyst layers are installed to ensure the required oxidation of $SO_2$ to $SO_3$, such that the emissions targets can be reached. As the $SO_2$ oxidation reaction is exothermal and reversible, heat has to be removed in order to achieve optimal thermodynamic conditions for the $SO_2$ conversion. Usually heat is withdrawn in heat exchangers installed between the catalyst layers, using steam generators, steam super heaters and/or gas/gas heat exchangers, while ensuring that the cooling media always stays above the sulfuric acid dew point temperature in the process gas.

The incinerator, catalytic oxidation reactor and the $SO_2$ converter consumes $O_2$ and the $O_2$ is supplied as atmospheric air or $O_2$ enriched air to the incinerator and/or added in a position between the outlet of the incinerator and the inlet of the catalytic reactors. To reduce fuel consumption in the incinerator and lower heat exchanger cost, the largest possible fraction of the necessary air is added just upstream the catalytic oxidation reactor. In principle, this air could be split between the catalytic oxidation reactor and the $SO_2$ converter, but the increased complexity of the plant due to two air control systems will most likely outscore the benefits of a slightly lower process gas flow through the catalytic oxidation reactor.

Another implication of the $O_2$ supply to the Claus tail gas is to ensure that the resulting mixture of Claus tail gas, comprising combustible gases, and combustor off gas and air, comprising $O_2$, will not form an explosive mixture, with the associated risk of causing an uncontrolled oxidation (explosion) in the plant. This can be achieved by ensuring that the concentration of combustibles is safely below the so-called lower flammability level, LFL, or the concentration of $O_2$ is below the so-called Limiting Oxygen Concentration, LOC. Staying below the LFL of the mixture requires dilution of the Claus tail gas by large amounts of process gas from the combustor and/or the $O_2$ containing gas, typically air. Staying below the LOC of the mixture requires good control of the addition of $O_2$, such that it will not exceed the safe value. Such a scheme will typically require adding the $O_2$ containing gas in one or more stages.

The choice of strategy is best made with knowledge about the composition of the Claus tail gas and the extent of fluctuations of combustibles, which is likely in the tail gas. An upset condition in the upstream Claus plant could result in an increase in concentration of combustibles, e.g. $H_2S$ which will increase the heating value of the gas and thus increase energy release in the process, increasing process gas temperatures. Care must be taken to design the plant sufficiently robust, such that the equipment can withstand a given increase in temperature. This is especially relevant for the catalyst for oxidation of $H_2S$, $H_2$, CO, $CS_2$, CO and $S_x$. The semi-catalytic sulfuric acid plant layout is robust towards such fluctuations as a large fraction of the combustibles gases are oxidized in the combustor and the hot gas before the process gas cooling in the waste heat boiler.

The $SO_3$ gas leaving the $SO_2$ converter is substantially free of $S_3$, $H_2S$, COS, $CS_2$, $H_2$ and CO. The $SO_3$ will combine with $H_2O$ in the process gas to form $H_2SO_4$ vapor, which then condenses as concentrated sulfuric acid in the indirectly cooled sulfuric acid condenser. The condensed sulfuric acid is in the 90-98.5% w/w $H_2SO_4$ concentration range, depending on the $H_2O$ to $SO_3$ ratio in the process gas. Claus tail gases generally have high $H_2O$ concentrations (>20 vol % $H_2O$) and thus 90-94% w/w $H_2SO_4$ is the expected acid concentration. The concentrated sulfuric acid is withdrawn from the sulfuric acid condenser, cooled and sent to the Claus reaction furnace or a sulfuric acid storage tank.

The cooled $SO_3$ gas is substantially free of $SO_3$ and $H_2SO_4$ and can be directed to the stack. In some cases, additional units for $SO_2$ and acid mist removal may be required, such as $SO_2$ scrubbers and wet electrostatic filters.

Atmospheric air is typically used as cooling media in the sulfuric acid condenser and most of the heat recovered from the $SO_3$ gas cooling and acid condensation is used in the sulfuric acid plant, e.g. as heated combustion and oxidation air and for preheating boiler feed water or the Claus tail gas.

Should the $SO_2$ converter or sulfuric acid condenser safety shut down due to operating condition out of bounds, it will be possible to bypass the process gas from the catalytic oxidation reactor directly to the stack, such that the incinerator can be kept in operation and thus the Claus plant can be kept in operation too. If the restrictions on (temporary) emissions allows it, the process gas upstream the catalytic oxidation reactor could be bypassed to the stack.

An alternative to the semi-catalytic sulfuric acid plant layout is the fully-catalytic sulfuric acid plant layout. In such a layout the existing incinerator will only be used when the WSA plant is not in operation, i.e. the sulfuric acid plant can be built without having to shut down the Claus plant until the necessary tie-in is required. Under normal operation the incinerator can operate in a standby operation with minimum fuel gas consumption, thus saving fuel compared to the normal operation in a Claus process (with a TGTP) layout in which the entire Claus tail gas is directed to the incinerator to be heated to 800-900° C. In case of an emergency or planned shutdown of the sulfuric acid plant, the Claus tail gas can be directed to the incinerator.

The fully-catalytic sulfuric acid plant will in most cases be able to operate without fuel gas consumption as there will be sufficient heating value for catalytic oxidation of $H_2$, CO, $H_2S$, COS, $CS_2$ and $S_8$ to $H_2O$, $CO_2$ and $SO_2$ as well as oxidation of $SO_2$ to $SO_3$ at 200° C. to 500° C. in the Claus tail gas. The contributors to the heating value are primarily $H_2S$, $H_2$ and CO. Should these values become too low, a small fraction of the feed gas to the Claus plant can be directed to the Claus tail gas and in that way increase the heating value. Another way of increasing the heating value of the Claus tail gas is to deliberately lower the conversion in the Claus plant. This can be done by e.g. increasing the $H_2S/SO_2$ ratio and/or operate the Claus catalytic reactors with non-optimal temperatures (usually increasing inlet temperatures).

Although normally sufficiently high for the sulfuric acid plant, the heating value of the Claus tail gas is still considered low and thus a very heat efficient sulfuric acid plant layout is required, i.e. a considerable fraction of the energy released by the oxidation of reduced species in the Claus tail gas ($H_2$, CO, $H_2S$, COS, $CS_2$), oxidation of $SO_2$ and conversion of $SO_3$ into concentrated sulfuric acid must be used for heating up the Claus tail gas and the air required for the oxidation reactions.

The Claus tail gas and optionally the pit vent gas are preheated by excess heat from the sulfuric acid plant, preferably in the form of high pressure steam or hot cooling air. As the Claus tail gas does not contain $O_2$, $O_2$ must be supplied to the tail gas for the oxidation reactions to proceed. Preferably atmospheric air is used as the $O_2$ carrier, but $O_2$ enriched air and/or recycled process gas is also an option.

Adding air to the Claus tail gas is not trivial as formation of explosive mixtures is possible and this risk must be minimized/eliminated. Especially the content of $H_2$ and $H_2S$ are relevant for forming explosive mixtures as these compounds have Lower Flammability Limits, LFL, of ~4 vol % at room temperature, decreasing to 1.8-3.2 vol % when the Claus tail gas is heated to ~ 200° C. A rule of thumb states that the concentration of combustibles must not exceed 25% of the lower flammability limit, i.e. the sum of $H_2$ and $H_2S$ concentrations should not exceed 0.5-0.8 vol % after mixing with air. In some industries it is allowed to operate with concentrations up to 50% of the LFL. Such dilution would result in a substantial amount of air addition, which increase the process gas flow and thus make all parts of the sulfuric acid plant larger. Furthermore, the energy balance would be compromised as the substantial amount of air addition would require much energy to be heated up and fuel addition may become necessary. Another option would be to dilute the Claus tail gas with process gas recycled from a position downstream the catalytic oxidation reactors. This option will efficiently dilute the process gas to below the LFL limit, while limiting the process gas volume increase to only a smaller part of the plant, compared to the entire plant with dilution with atmospheric air.

A more energy efficient approach is to exercise staging of $O_2$ to the Claus tail gas, such that the $O_2$ concentration always can be kept below the so-called Limiting Oxygen Concentration, LOC. Below this $O_2$ concentration, the mixed gas will be non-flammable, independent of the concentration of combustibles. By using $O_2$ staging, the oxidation of the reduced species in the Claus tail gas can be carried out with minimum $O_2$ addition, thus minimizing plant size and eliminating the requirement for external energy supply via e.g. fuel addition and (electrical) heaters. This approach also has the benefit of simple control as only the amount of oxygen containing gas needs to be controlled, such that operation below the LOC is always achieved. Dilution with gas to stay below the LFL will depend on the concentration of combustibles, which can fluctuate over time or can have off sets, quickly increasing the concentration of combustables.

For optimal operation of the catalytic oxidation steps, the operating temperatures must also be firmly controlled, such that the inlet temperature is above the ignition temperature of the catalyst and the outlet temperature is below the maximum design temperature of the catalyst (e.g. to avoid mechanical damage or chemical sintering). To control these temperatures recycling of already converted process gas can be utilized. The temperature can in principle also be controlled by air dilution, but air addition is also constrained by flammability limits. Furthermore, recycling is favored over simple dilution as dilution increases the process gas flow in all process equipment, whereas recycling of process gas limits the increase in process gas flow to a limited number of process equipment.

The preheated Claus tail gas and sulfur pit vent gas may bemixed with preheated atmospheric air, such that the $O_2$ concentration is below the Limiting Oxygen Concentration limit, and then directed to a first catalytic oxidation reactor. The catalyst is characterized by not containing noble metals and thus only carries out partial oxidation of the combustible compounds in the process gas. The catalyst oxidizes $H_2S$ to $SO_2$ and $H_2O$ and $CS_2$ to COS and $SO_2$, while COS, CO and $H_2$ pass almost unhindered through the catalyst. The advantage of this catalyst is that it has a significantly lower ignition temperature than a noble metal based oxidation catalyst (see EP 2878358). The heat evolved in the first oxidation reactor increases the process gas temperature to such an extent that the temperature is above the ignition temperature of the second oxidation catalyst, which fully converts all reduced species (primarily COS, CO and $H_2$) to $SO_2$, $H_2O$ and $CO_2$. It may be necessary to supply extra $O_2$ before the second oxidation reactor, either as staging to keep the $O_2$ concentration below the LOC value or by dilution to keep the combustible concentration below 25%-50% of the LFL. In situations with high $H_2S$ concentration in the Claus tail gas, the heat evolved in the first oxidation reactor may result in a too high outlet temperature to be fit for the inlet of the second oxidation reactor and thus it may be necessary to install a heat exchanger between the first and second oxidation reactor.

To control the outlet temperature of the second catalytic reactor, a process gas recirculation loop is preferably applied, the loop can be equipped with temperature control (heat exchanger), such that the temperature at the inlet of the second oxidation reactor can be controlled at the same time.

Downstream the second oxidation reactor all sulfur containing species are in the $SO_2$ form, possibly with a few percent converted into $SO_3$. The $SO_2$ gas is then optionally adjusted in temperature and $O_2$ concentration by passing the process gas through a heat exchanger and adding preheated air, such that the desired temperature and $O_2$ to $SO_2$ ratio is achieved at the inlet to the $SO_2$ converter. The process gas temperature can also be adjusted by the preheated air temperature, thus eliminating the need for a heat exchanger on the process gas stream-such layout optimization will depend on the concentration of the combustibles in the Claus tail gas and air addition to the upstream catalytic reactors. If the air preheating involves heat exchange with the partially or fully converted process gas, it must be assured that the air temperature is above the sulfuric acid dew point temperature in the process gas. If not, there is a risk that sulfuric acid will condense on the surface of the heat exchanger, causing corrosion of the heat exchanger material and possible damage.

In the $SO_2$ converter, $SO_2$ is oxidized to $SO_3$ by means of a vanadium based catalyst installed in one or more catalyst layers with heat exchangers installed between the layers. The required conversion efficiency determines the number of catalyst layers, but typically 1-3 layers are necessary. The $SO_3$ gas leaving the $SO_2$ converter is passed to a sulfuric acid condenser in which the process gas is cooled indirectly with atmospheric air, sulfuric acid is condensed and withdrawn and cleaned process gas is directed to the stack. The hot cooling air from the sulfuric acid condenser is used in the sulfuric acid plant as an $O_2$ source, thereby utilizing the heat withdrawn in the condenser in the sulfuric acid plant.

The sulfuric acid is cooled and may be pumped to a sulfuric acid storage tank from which the sulfuric acid is pumped to the Claus reaction furnace for decomposition and reformation to elemental sulfur in the Claus plant.

An alternative to the two-stage catalytic oxidation reactors with air staging, mixing and heat exchange between the reactors, is a cooled reactor in which both catalysts are positioned in the cooled reactor and the internal cooling ensures that the catalysts are operating inside their allowable minimum and maximum temperatures.

If it becomes too difficult to stay below the LFL and/or LOC in this cooled reactor, an alternative is to use two reactors in series and have at least one of them being cooled. The first catalytic reactor is most suitable for being cooled as the heat evolvement is typically highest and fluctuations in the heating value will typically be from $H_2S$, which will be oxidized in the first catalytic reactor and thus the risk of overheating the catalyst is lowered.

As the heating value of the Claus tail gas is relatively low, the conservation of the reaction energy released within the sulfuric acid plant is of vital importance and thus the optimal combination of air staging, air dilution, process gas recirculation and position of heat exchanger(s) will depend on the exact amount of the combustibles in the Claus tail gas. Also any deviations in the heating value of the Claus tail gas must be taken into account as such deviations will change the temperature and $O_2$ profiles in the sulfuric acid plant. It may be that a non-optimal design, with regard to the normal Claus tail gas composition, may be preferred in order to be able to operate the sulfuric acid plant safely if the heating value suddenly increases, e.g. as a result in changes in the feed gas composition to the Claus plant or poor $O_2$ control in the Claus plant. Such design will typically involve larger than necessary process gas recirculation as that is an efficient method for suppressing temperature increases in the catalytic oxidation reactors.

As the Claus tail gas incinerator is decoupled from the fully-catalytic sulfuric acid plant, a start-up heater will be required, to heat the TGTP plant feed to the required temperature of 200-400° C., i.e. the minimum ignition temperatures of Claus tail gas over the different catalysts. The heater could be both a fired heater, a heat exchanger with hot media from an external source or an electric heater. The position of the start-up heater is preferably upstream the second catalytic oxidation reactor, but could also be upstream the first catalytic oxidation reactor or in the process gas recirculation loop.

Independent of the layout of the sulfuric acid TGTP, the operation of the Claus reaction furnace will be the same and it must be assured that the Claus plant can operate safely and reliably both with and without sulfuric addition and during start-up and shut-down sequences.

The control system for the Claus burner must be updated to decrease the inflow of combustion air when sulfuric acid is injected. Normally the combustion air flow control is a combination of a feed forward system which controls the majority of the air flow and a feedback system which adjust a minority of the flow to obtain the desired $H_2S$ to $SO_2$ ratio in the Claus tail gas. The feedback system will stay unchanged, but the feed forward system must be updated to reflect the new feed streams. Based on a given feed stream composition and flow, an $O_2$ demand can be calculated based on the chemical reactions taking place between the compounds in the given feed stream and the $O_2$. The $O_2$ demands for each feed stream are then added and the sum will be the signal to the feed forward combustion air controller to adjust the combustion air flow to the calculated value. The general equation for calculation of the combustion air flow is $G_{air} = \Sigma K_i \cdot G_i$ $G_{air}$ is the required combustion air flow for carrying out the necessary oxidation reactions in the Claus reaction furnace, i.e. complete oxidation of hydrocarbons and $NH_3$ and fractional conversion of the $H_2S$ in the feed. $G_i$ is the flow of individual feed streams to the Claus reaction furnace and includes the $H_2S$ containing feed stream(s), pit vent gas, the recycle stream of $H_2S$ gas or $H_2SO_4$ liquid, fuel gas and any atomization fluid for the $H_2SO_4$ liquid. These flows are measured by instruments and the values are transferred to the plants control system for further processing. The $K_i$ values are the air demand factors; i.e. how much combustion air is required to oxidize one unit of feed stream i. These factors depend on the composition of the feed streams and either the design composition can be used or an analyzed composition can be used, should the feed gas composition have changed. For most feed streams the $K_i$ value will be a positive number, whereas for the sulfuric acid stream and optionally atomization air, the K value would be negative. Examples of calculations of the $K_i$ values are given in examples 1-3.

The composition of feed streams may change over time, may deviate slightly from the design values and flow measurements may not be correct. Therefore, the feed forward signal may not be correct either and to compensate for these (minor) deviations, the feedback signal will compensate for that by fine tuning the combustion air addition. Typically, an analyzer, measuring the $H_2S/SO_2$ ratio in the Claus tail gas, will provide the feedback signal. If the ratio is too high, slightly more combustion air is added.

The acid injection nozzles are typically positioned in a way that the sulfuric acid is atomized into the Claus reaction furnace without affecting the flame and stability of the flame. An example could be three nozzles positioned at the burner wall around the periphery of the flame, pointing the nozzle tips slightly towards the center of the furnace room. A swirl motion of the atomized acid could also be provided, such that mixing of the acid droplets and combusted gases will be more efficient.

Complete $H_2SO_4$ evaporation and decomposition in the Claus reaction furnace is important for the operation of the Claus plant. Therefore, the atomization of the sulfuric acid is important and as droplet evaporation rate depend on the square of the droplet diameter, the atomization nozzle must be able to provide as small droplets as possible, preferably smaller than 500 μm in diameter. Some hydraulic nozzles operating at high pressure will provide such small droplets while pneumatic nozzles generally will be able to provide sufficiently small droplets for fast evaporation. Nozzles are typically characterized by the $D_{0.9}$ value which defines the diameter, where 90% of the total mass (or volume) of the droplets have smaller diameters.

If large droplets are expected, impaction surfaces in the furnace room can be installed. Such impaction surface can be e.g. vector walls or checker walls, in which the gas flow experiences a sudden change in flow direction and large droplets, due to their high inertia, will not be able to change direction and will thus impact on the surface from which they will quickly evaporate. In principle the acid injection nozzles could be pointed towards the refractory walls of the Claus reaction furnace as the hot refractory walls also will provide diversion of the process gas and heat for fast evaporation of impacted droplets. Also a bed of packed materials (e.g. Raschig rings) can act as impaction surfaces for large droplets.

The droplet sizes from an atomization nozzle may change over time as the nozzle tip become worn, due to plugging, erosion and corrosion. If left unnoticed, the droplets can become so large that they will not evaporate completely in the Claus reaction furnace with the associated risk of sulfuric acid corrosion in the downstream Claus plant and deactivation of the Claus catalyst in the Claus reactors.

The state of the nozzle can be monitored by observation through sight glasses, by withdrawing the nozzles from the Claus reaction furnace and carry out inspection and by continuous monitoring of the operating parameters of the nozzle. Each nozzle is preferably equipped with flow and pressure monitors for both the sulfuric acid side and atomizing media side. Each fluid side will have a characteristic interdependence between flow and pressure (drop) and if this characteristic value change over time, this could be caused by a change in geometry of the nozzle. For instance, corrosion of a nozzle will result in a larger flow with the same pressure compared to a new nozzle.

By continuous monitoring these characteristic parameters and calculating a characteristic value for the nozzle and e.g. putting high and low alarms on this value, a poorly performing nozzle can be detected and changed before any damage will take place. Preferably, the nozzles are designed such that they can be isolated and withdrawn during operation of the Claus plant.

TripsIt can be necessary to stop the sulfuric acid injection into the Claus reaction furnace, e.g. due to a failure of the acid pump at the sulfuric acid tank, failure of the flow controller of the sulfuric acid and loss of atomization fluid. In such a situation, the trips system of the Claus plant must be updated to handle such incidents, allowing trips of the acid injection nozzles while keeping the Claus plant in operation. In case of a stop in the acid injection, the feed forward combustion air control will compensate for the lack of oxygen by increasing the air flow, thereby bringing the Claus plant back to normal operation.

During operation, the atomization nozzles and nozzles are cooled by the flow of atomization air and especially by the flow of the sulfuric acid. With a stop of acid flow, the majority of the cooling disappears and the temperature of the nozzle will increase. The nozzle material will be able to withstand the operating temperature of the Claus reaction furnace, but any acid trapped in the nozzle will become hot. Corrosion rates will increase significantly and boiling of the sulfuric acid may take place too. To avoid this situation, the acid lines may be flushed with a gaseous flushing media to remove liquid acid from the nozzles, such that acid corrosion will be minimized while the nozzle will be provided with some extra cooling and ingress of Claus reaction furnace process gas into the nozzle is avoided. The flushing will continue as long as the acid flow is stopped. The flushing media will typically be a stream of $N_2$, which is already available and used in Claus plants and is an inert gas that will not interfere with the chemistry in the Claus reaction furnace. As an alternative, air can be used as flushing media, but then also $O_2$ will be added to the Claus reaction furnace and there is a risk of interfering with the combustion air control if the flushing stream is not equipped with a flow instrument. Stop of sulfuric acid injection will also result in a temperature increase in the Claus reaction furnace, but the temperature increase will in most circumstances not be problematic as the refractory walls will be able to withstand the higher temperature and a higher temperature will not have a bad impact of the Claus reaction furnace chemistry.

In the event of an acid injection trips, the atomization media will continue flowing, such that the nozzle is cooled and process gas ingress to the nozzle is avoided. Figures.

Figure 1:
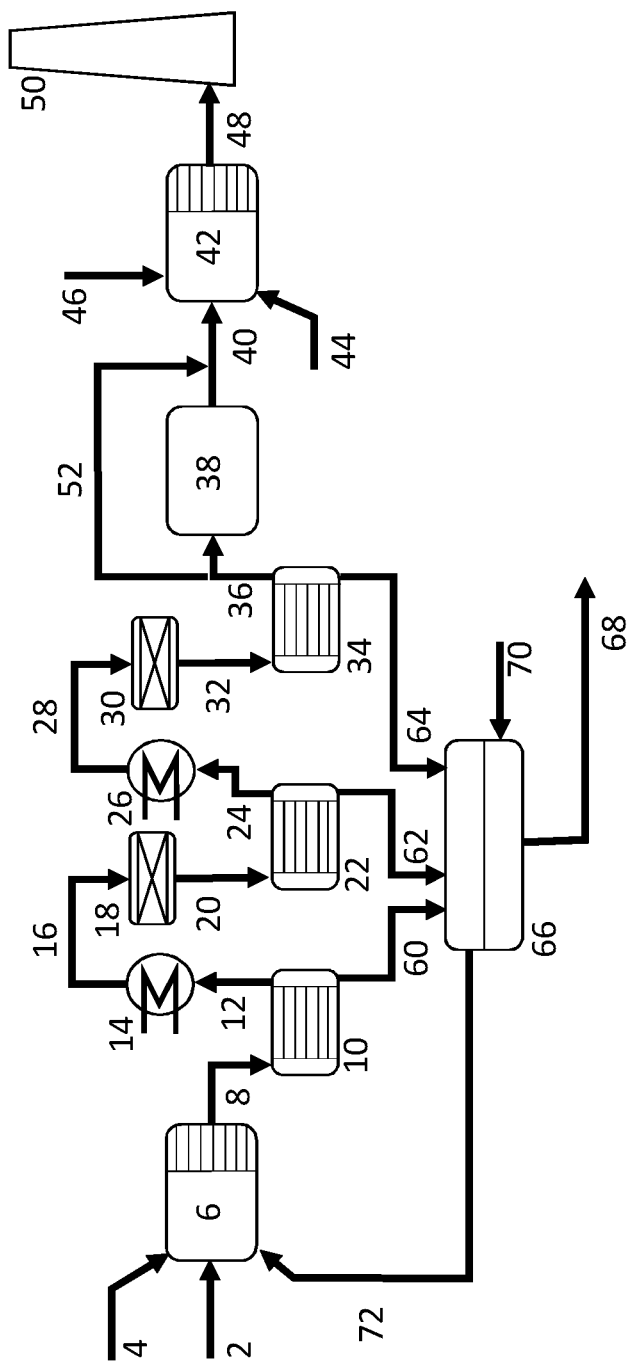
FIG. 1 depicts a well-known Claus layout with tail gas treatment plant (TGTP)

In FIG. 1, showing a well-known Claus layout with tail gas treatment plant (TGTP), the Claus plant receives a feed gas comprising $H_2S$ (2), which is combusted with atmospheric or enriched air (4) in the Claus reaction furnace (6). Depending in the requirement for sulfur recovery, the so-called pit vent gas (72), comprising $H_2S$, can also be directed to the Claus reaction furnace (6). In cases with low sulfur recovery requirements, the pit vent gas can be sent to the tail gas incinerator (42). In the Claus reaction furnace, $H_2S$ is partly oxidized to $SO_2$ and forms sulfur. Any content of $NH_3$ and/or hydrocarbons in the feed gas is decomposed to $N_2$ and $H_2O$ and $CO_2$ and $H_2O$ respectively. The temperature of the Claus reaction furnace is typically 1,000-1,400° C. with residence times in the range 1-2 seconds. The Claus reaction furnace gas is typically cooled to around 300° C. in a waste heat boiler, located just at the furnace outlet, and the off gas (8) is optionally directed to a sulfur condenser (10) in which elemental sulfur is condensed and withdrawn to the sulfur pit (66) via line 60. The condenser off gas (12) is reheated in a heat exchanger (14) or by means of an in-duct burner and the reheated process gas (16) enters the first Claus reactor (18), which is filled with catalyst comprising activated alumina or titania to react $H_2S$ with $SO_2$ to form elemental sulfur. The reactor off gas (20) is directed to a further sulfur condenser (22), where elemental sulfur is condensed and withdrawn via line 62 to the sulfur pit (66). The process gas (24) then passes a further catalytic Claus stage via process gas reheater (26), Claus reactor (30) and sulfur condenser (34), connected by lines 28 and 32. Condensed sulfur is withdrawn to the sulfur pit (66) via line 64

After the second catalytic stage (30) and condenser (34), the sulfur recovery is about 94-97% and depending on the local requirements for sulfur recovery (emissions), additional means for sulfur recovery is installed. Such means are typically called Claus tail gas treatment plants (TGTP) (38) and numerous types of TGTPs exist. They can be a further Claus reactor followed by a sulfur condenser, which may be a so-called sub dew point reactor, a catalyst system for selective oxidation of $H_2S$ to elemental sulfur or amine based $H_2S$ scrubbing units, which capture the $H_2S$ in the tail gas (36) and returns it to the Claus reaction furnace (6). Such plants allow a high sulfur recovery, but with costs up to the cost of the Claus plant itself, depending of the complexity and efficiency of the TGTP.

Downstream the TGTP, the off gas 40 is directed to an incinerator (42), which thermally oxidizes all sulfur compounds to $SO_2$ and after cooling in a waste heat boiler (typically a part of the incinerator) the incinerator off gas (48) is sent to the stack (50). The tail gas flow from the Claus plant has low caloric value and no oxygen, so fuel gas (44) and combustion air (46) is required to operate the incinerator.

In case the TGTP unit fails, the tail gas can be bypassed the TGTP via line 52 and be directed to the incinerator (42), such that the Claus plant can be kept in operation.

All liquid sulfur 60, 62, 64 from the condensers (10,22, 34) is collected in the sulfur pit (66). The pit is vented/flushed with atmospheric air (70) to drive off $H_2S$ dissolved in the sulfur. The sulfur pit vent gas (72) contains a little $H_2S$ and can either be directed to the Claus reaction furnace (6) or the incinerator (42). A combined flow of liquid sulfur is withdrawn in line 68.

Figure 2:
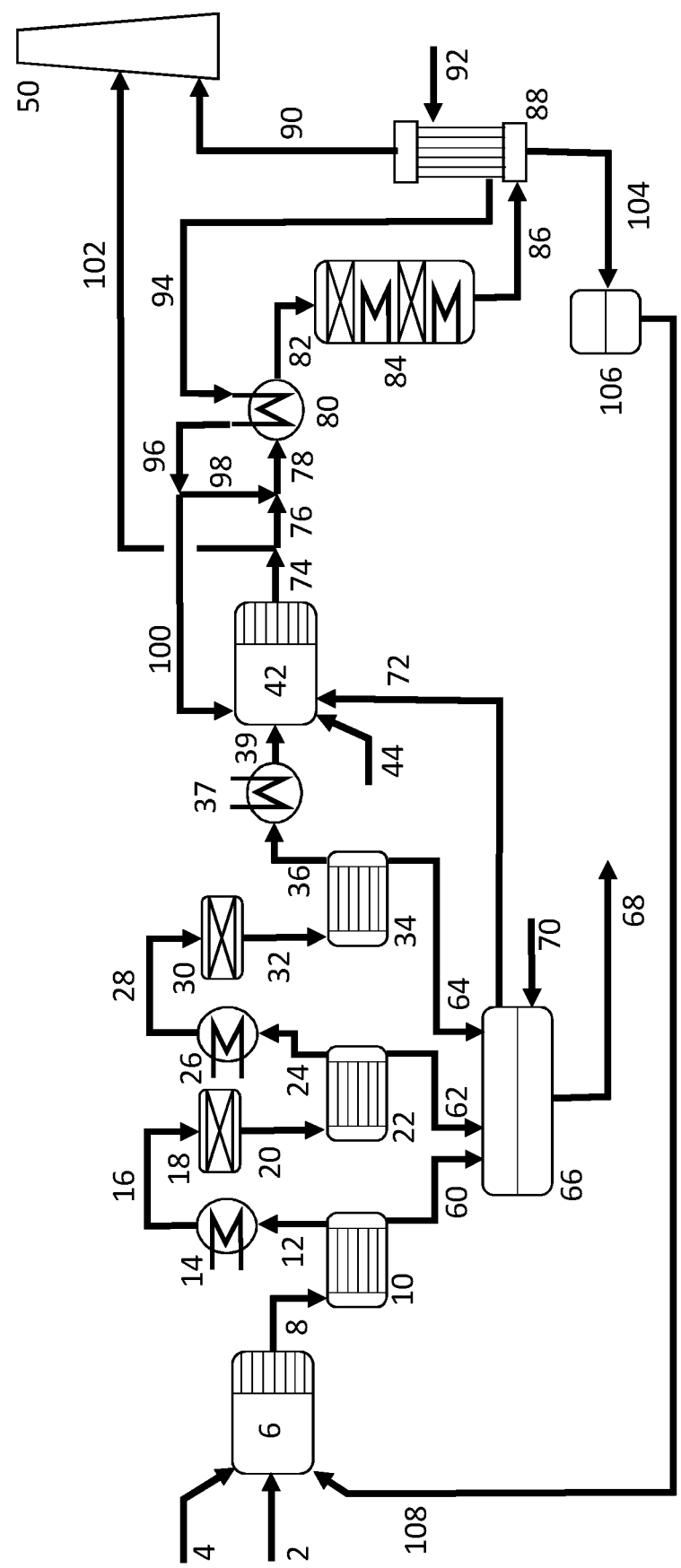
FIG. 2 depicts a Claus layout with a sulfuric acid TGTP and recirculation of acid to the Claus reaction furnace.

In FIG. 2, a wet type sulfuric acid plant is the TGTP, characterized by at least part of the produced sulfuric acid is recycled to the Claus reaction furnace. The Claus plant receives a feed gas comprising $H_2S$ (2), which is combusted with atmospheric or enriched air (4) in the Claus reaction furnace (6). In the Claus reaction furnace, $H_2S$ is partly oxidized to $SO_2$ and forms sulfur. Any content of $NH_3$ and/or hydrocarbons in the feed gas is decomposed to $N_2$ and $H_2O$ and $CO_2$ and $H_2O$ respectively. The temperature of the Claus reaction furnace is typically 1,000-1,400° C. with residence times in the range 1-2 seconds. The Claus reaction furnace gas is typically cooled to around 300° C. in a waste heat boiler, located just at the furnace outlet, and the off gas (8) is optionally directed to a sulfur condenser (10) in which elemental sulfur is condensed and withdrawn to the sulfur pit (66) via line 60. The condenser off gas (12) is reheated in a heat exchanger (14) or by means of an in-duct burner and the reheated process gas (16) enters the first Claus reactor (18), which is filled with catalyst comprising activated alumina or titania to react $H_2S$ with $SO_2$ to form elemental sulfur. The reactor off gas (20) is directed to a further sulfur condenser (22), where elemental sulfur is condensed and withdrawn via line 62 to the sulfur pit (66). The process gas (24) then passes a further catalytic Claus stage via process gas reheater (26), Claus reactor (30) and sulfur condenser (34), connected by lines 28 and 32. Condensed sulfur is withdrawn to the sulfur pit (66) via line 64. The tail gas (36) is heated in a heat exchanger (37), preferably using excess heat from the sulfuric acid plant, typically in the form of high pressure steam. The heated Claus tail gas (39) is directed to an incinerator (42), where it is mixed with hot air (100) from the downstream sulfuric acid plant, fuel (44) and the pit vent gas (72). The pit vent gas (72) can also be directed to the Claus reaction furnace (6). The temperature and residence time in the incinerator is sufficiently high to allow for complete conversion of all sulfur containing species to $SO_2$, a few percent of the $SO_2$ is further oxidized to $SO_3$. The incinerator off gas is cooled in a waste heat boiler, which is usually an integrated part of the incinerator, and is directed via line 74,76 and 78 to a heat exchanger (80) to be cooled further to the desired temperature at the inlet to the $SO_2$ converter (84). In the $SO_2$ converter, 1-3 layers of $SO_2$ oxidation catalyst comprising vanadium oxide are installed, each layer is separated by a heat exchanger to remove heat of reaction. The fully converted $SO_2$ converter off gas (86) is directed to a sulfuric acid condenser (88), in which sulfuric acid is condensed, concentrated and separated from the process gas, leaving at the bottom of the condenser via line 104 and is cooled and pumped to a sulfuric acid storage tank (106). The clean condenser off gas (90) is directed to the stack (50). The sulfuric acid condenser (88) uses indirect air cooling, where cold cooling air (92) enters in the top and hot air leaves in the bottom (94). At least a part of the hot air may be further heated in heat exchanger (80) and the further heated air is directed to the incinerator via line 100 and some of the further heated air (98) is added to the incinerator off gas (76) to ensure that there is sufficient oxygen available for the $SO_2$ oxidation in the $SO_2$ converter (84). The further heated air (98) can also be added to the process gas (82) downstream the air heater (80), with the associated benefit of reducing the size of the heat exchanger.

Should the $SO_2$ converter (84) or the sulfuric acid condenser (88) somehow fail, the incinerator off gas (74) can be directed to the stack via line 102, allowing the Claus plant to be kept in operation, which will ensure 94-97% sulfur abatement during the failure period.

The sulfuric acid from the sulfuric acid storage tank (106) passes through a pump and is directed to the Claus reaction furnace (6) via line 108. The sulfuric acid is atomized into the furnace either via hydraulic nozzles or preferably via pneumatic (two-fluid) nozzles.

Figure 3:
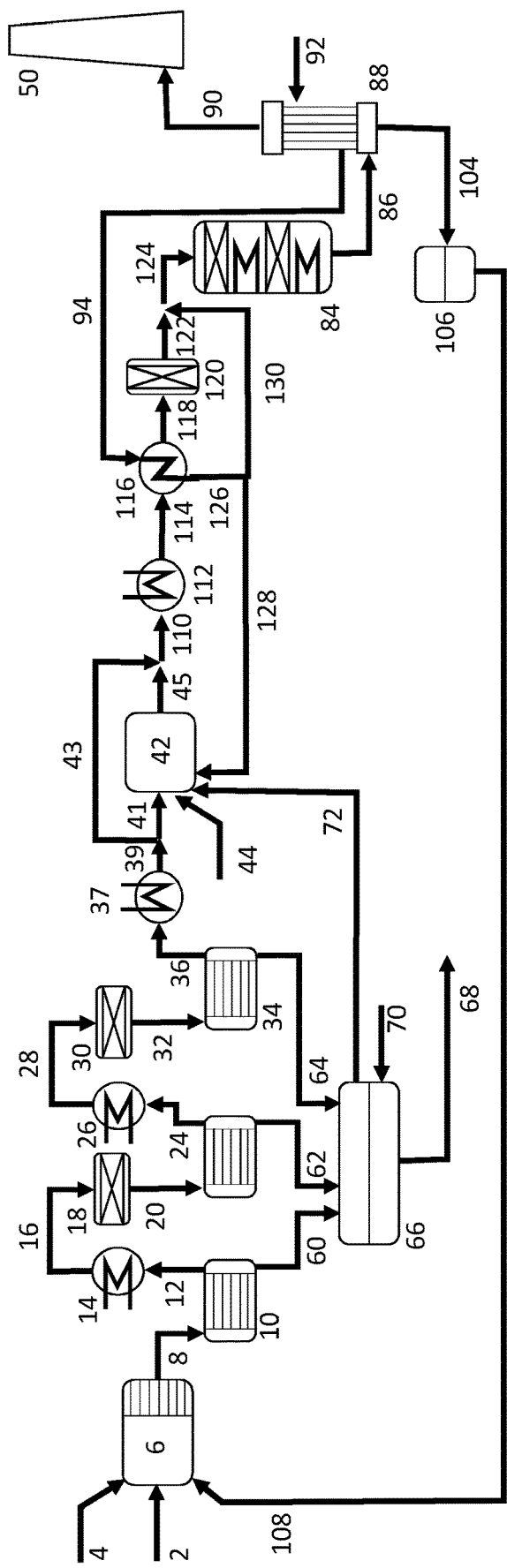
FIG. 3 depict a Claus layout with a partly catalytic sulfuric acid TGTP and recirculation of acid to the Claus reaction furnace.

FIG. 3 show a sulfuric acid plant as the TGTP, in which a part of the sulfur compounds in the Claus tail gas (36) are catalytically oxidized.

The Claus plant receives a feed gas comprising $H_2S$ (2), which is combusted with atmospheric or enriched air (4) in the Claus reaction furnace (6). In the Claus reaction furnace, $H_2S$ is partly oxidized to $SO_2$ and forms sulfur. Any content of $NH_3$ and/or hydrocarbons in the feed gas is decomposed to $N_2$ and $H_2O$ and $CO_2$ and $H_2O$ respectively. The temperature of the Claus reaction furnace is typically 1,000-1,400° C. with residence times in the range 1-2 seconds. The Claus reaction furnace gas is typically cooled to around 300° C. in a waste heat boiler, located just at the furnace outlet, and the off gas (8) is optionally directed to a sulfur condenser (10) in which elemental sulfur is condensed and withdrawn to the sulfur pit (66) via line 60. The condenser off gas (12) is reheated in a heat exchanger (14) or by means of an in-duct burner and the reheated process gas (16) enters the first Claus reactor (18), which is filled with catalyst comprising activated alumina or titania to react $H_2S$ with $SO_2$ to form elemental sulfur. The reactor off gas (20) is directed to a further sulfur condenser (22), where elemental sulfur is condensed and withdrawn via line 62 to the sulfur pit (66). The process gas (24) then passes a further catalytic Claus stage via process gas reheater (26), Claus reactor (30) and sulfur condenser (34), connected by lines 28 and 32. Condensed sulfur is withdrawn to the sulfur pit (66) via line 64.

The Claus tail gas (36) is heated in heat exchanger (37) preferentially by means of excess energy from the sulfuric acid plant, preferably in the form of high pressure steam. Downstream the tail gas heater (37), the Claus tail gas is split into two parts: one part (41) is directed to the incinerator (42) and one part is via line 43 directed to a position just downstream the incinerator (42). The incinerator (42) receives oxygen from hot air from the sulfuric acid plant (128), fuel (44) and optionally pit vent gas (72) from the sulfur pit (66) and all sulfur compounds are oxidized to $SO_2$. The hot process gas from the incinerator (45) is mixed with the bypassed part of the Claus tail gas (43) to form a mixed process gas (110), which will comprise an amount of combustible Claus tail gas compounds such as $H_2S$, COS, $CS_2$, $H_2$, $S_8$ and CO. The mixed process gas is cooled in one or two steps via a waste heat boiler (112) and/or a gas/air heat exchanger (116), such that the desired inlet temperature, which typically is 300° C. to 400° C. to the catalytic oxidation reactor (120) is achieved. The catalyst in (120) is of a type which oxidizes all Claus tail gas compounds such as $H_2S$, COS, $CS_2$, $H_2$, $S_8$ and CO to $SO_2$, $H_2O$ and $CO_2$. The oxidized process gas (122) is then directed to the $SO_2$ converter (84), in which the $SO_2$ is oxidized to $SO_3$. The air/gas heat exchanger (116) could also be positioned downstream the catalytic reactor (120), depending on the exact composition of the Claus tail gas (36).

The $SO_2$ converter (84) contains 1-3 catalyst layers for $SO_2$ oxidation with coolers installed between the layers in order to remove released heat of reaction. The converted and cooled process gas (86) is directed to the sulfuric acid condenser (88) in which concentrated sulfuric acid is withdrawn via line 104 and directed to the sulfuric acid storage tank (106) and the clean process gas (90) is directed to the stack (50). Cooling air for the indirectly cooled condenser (88) is supplied via line 92 and hot cooling air is withdrawn via line 94. Optionally, at least a fraction of the hot cooling air (94) is further heated in gas/air heat exchanger 116 and the further heated cooling air (126) is directed to the incinerator via line 128 and some of the air may be directed via line 130 to a position between the catalytic oxidation reactor (120) and the $SO_2$ converter inlet (124), supplying sufficient oxygen for the $SO_2$ oxidation in the $SO_2$ converter (84). The further heated air (130) can also be added upstream the catalytic oxidation reactor (120).

The sulfuric acid from the sulfuric acid storage tank (106) passes through a pump and is directed to the Claus reaction furnace (6) via line 108. The sulfuric acid is atomized into the furnace via hydraulic nozzles or preferably via pneumatic (two-fluid) nozzles.

In case of failure of the $SO_2$ converter (84) and sulfuric acid condenser (88), it will for a limited time be possible to direct the oxidized Claus tail gas (122) directly to the stack (50), allowing the Claus plant to be kept in operation.

Figure 4:
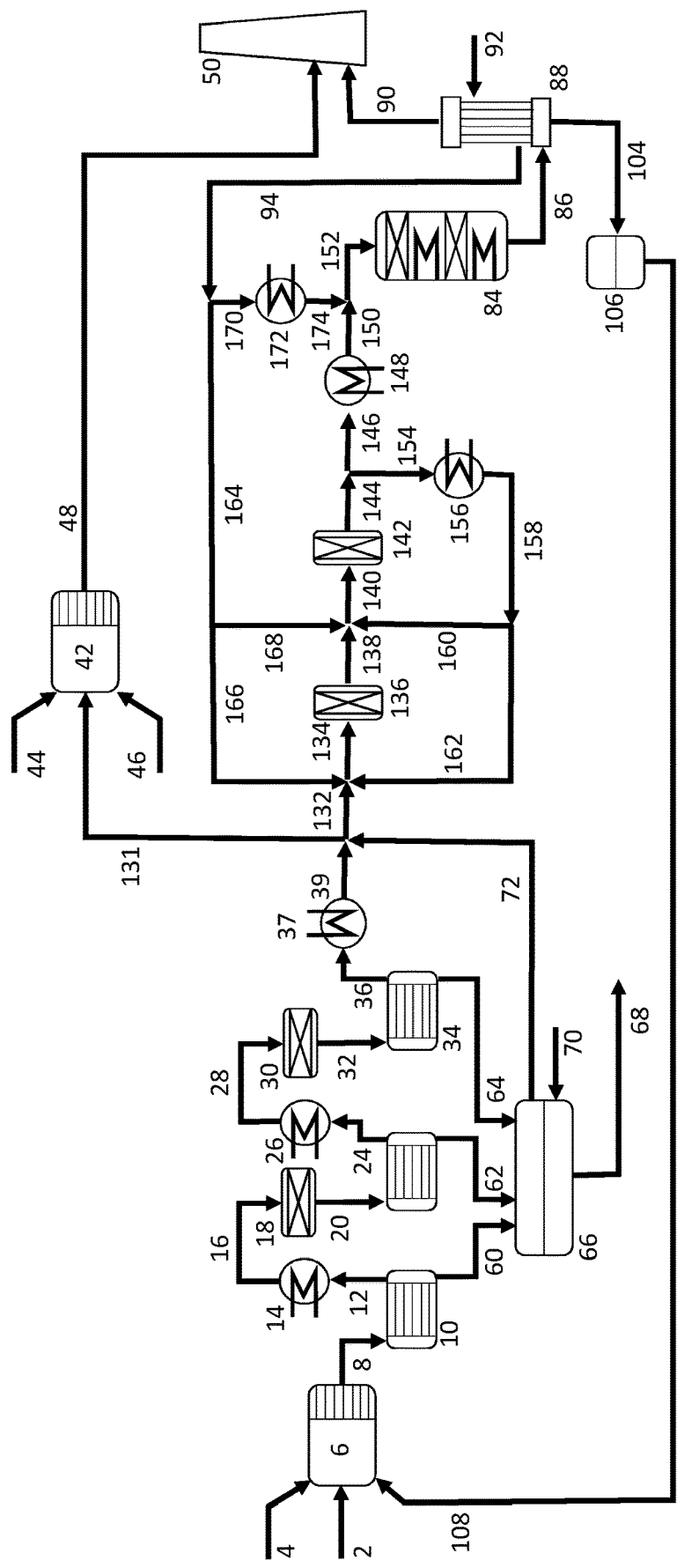
FIG. 4 depicts a Claus layout with a purely catalytic sulfuric acid TGTP and recirculation of acid to the Claus reaction furnace.

FIG. 4 show a sulfuric acid TGTP, in which the Claus tail gas is 100% treated by catalytic means.

The Claus plant receives a feed gas comprising $H_2S$ (2), which is combusted with atmospheric or enriched air (4) in the Claus reaction furnace (6). In the Claus reaction furnace, $H_2S$ is partly oxidized to $SO_2$ and forms sulfur. Any content of $NH_3$ and/or hydrocarbons in the feed gas is decomposed to $N_2$ and $H_2O$ and $CO_2$ and $H_2O$ respectively. The temperature of the Claus reaction furnace is typically 1,000-1,400° C. with residence times in the range 1-2 seconds. The Claus reaction furnace gas is typically cooled to around 300° C. in a waste heat boiler, located just at the furnace outlet, and the off gas (8) is optionally directed to a sulfur condenser (10) in which elemental sulfur is condensed and withdrawn to the sulfur pit (66) via line 60. The condenser off gas (12) is reheated in a heat exchanger (14) or by means of an in-duct burner and the reheated process gas (16) enters the first Claus reactor (18), which is filled with catalyst comprising activated alumina or titania to react $H_2S$ with $SO_2$ to form elemental sulfur. The reactor off gas (20) is directed to a further sulfur condenser (22), where elemental sulfur is condensed and withdrawn via line 62 to the sulfur pit (66). The process gas (24) then passes a further catalytic Claus stage via process gas reheater (26), Claus reactor (30)

and sulfur condenser (34), connected by lines 28 and 32. Condensed sulfur is withdrawn to the sulfur pit (66) via line 64.

The tail gas from the Claus plant (36) is heated in a heat exchanger (37), using excess heat from the sulfuric acid plant. The heated tail gas (39) is mixed with pit vent gas (72) and hot air (166) and optionally an amount of recycled process gas (162). This mixed process gas (134) is directed to a first catalytic reactor (136), in which a partial exothermal oxidation especially of $H_2S$ and $CS_2$ is carried out, but some of the compounds in the mixed process gas are not oxidized. The partly converted process gas (138) is then optionally cooled in a heat exchanger (not shown), mixed with recycled process gas (160) and/or optionally an amount of hot air (168) to produce a partly converted process gas (140) to the second catalytic reactor (142), in which all combustible compounds (notably $H_2$, CO and COS) are completely oxidized to $CO_2$, $H_2O$ and $SO_2$. The reactor off gas (144) is then split into a recycle fraction (154) and a fraction (146), which is directed to a process gas cooler (148) and further to the $SO_2$ converter (84). The recycled process gas (154) is optionally cooled in heat exchanger 156 and the cooled recycle gas (158) is directed to a position upstream the second catalytic reactor (142) via line 160 and optionally via line 162 to a position upstream the first catalytic reactor (136). A process gas recycle blower will overcome the pressure differences of the process gas, recycle stream and control dampers (not shown). The purpose of the recycling of oxidized process gas is temperature moderation in the catalytic converters 136 and 142. Converted process gas from any stage in the $SO_2$ converter (84) could also be used as a recycle gas, in order to optimize the temperature of the catalytic converters.

The cooled converted process gas (150) from the process gas cooler (148) is optionally mixed with hot air (174) such that the process gas to the $SO_2$ converter (152) has an appropriate temperature and contains sufficient oxygen for the $SO_2$ oxidation reaction. The process gas (152) is then directed to the $SO_2$ converter (84), in which the $SO_2$ is oxidized to $SO_3$. The converter contains 1-3 catalyst layers with coolers installed between the layers in order to remove heat of reaction. The converted and cooled process gas (86) is directed to the sulfuric acid condenser (88) in which concentrated sulfuric acid is withdrawn via line 104 and directed to the sulfuric acid storage tank (106) and the clean process gas (90) is directed to the stack (50). Cooling air for the indirectly cooled condenser (88) is supplied via line 92 and hot cooling air is withdrawn via line 94. Parts of the hot cooling air (94) can be supplied to one or more positions in the sulfuric acid plant: upstream the first catalytic reactor 136 via line 166, between outlet of first catalytic reactor (136) and inlet of second catalytic reactor (142) via line 168 and/or upstream the $SO_2$ converter (84) via line 174. The entire hot air stream (94) or any of the streams (164, 168, 164, 170) can be further heated in a heat exchanger, as shown for the hot air to the $SO_2$ converter (170), which is further heated in heat exchanger 172, before mixed with the process gas 150, possibly by heat exchange with superheated steam or hot process gas The sulfuric acid from the sulfuric acid storage tank (106) passes through a pump and is directed to the Claus reaction furnace (6) via line 108. The sulfuric acid is atomized into the furnace either via hydraulic nozzles or preferably via pneumatic (two-fluid) nozzles.

In case of failure of the sulfuric acid plant, the heated Claus tail gas (39) can be diverted to a thermal incinerator (42) via line 131. Fuel (44) and combustion air (46) is supplied to ensure heating value and oxygen for complete oxidation of combustible species in the Claus tail gas. The incinerator off gas is cooled in an integrated waste heat boiler and directed to the stack (50) via line 48.

As the process gas temperature is insufficient for starting catalytic $H_2S$ oxidation a start-up heater (not shown) is required to start up the sulfuric acid plant and it is preferably positioned just upstream the second catalytic reactor (142). The heater can either be electrical, fuel gas fired or receive a heating media from another process plant.

Figure 5:
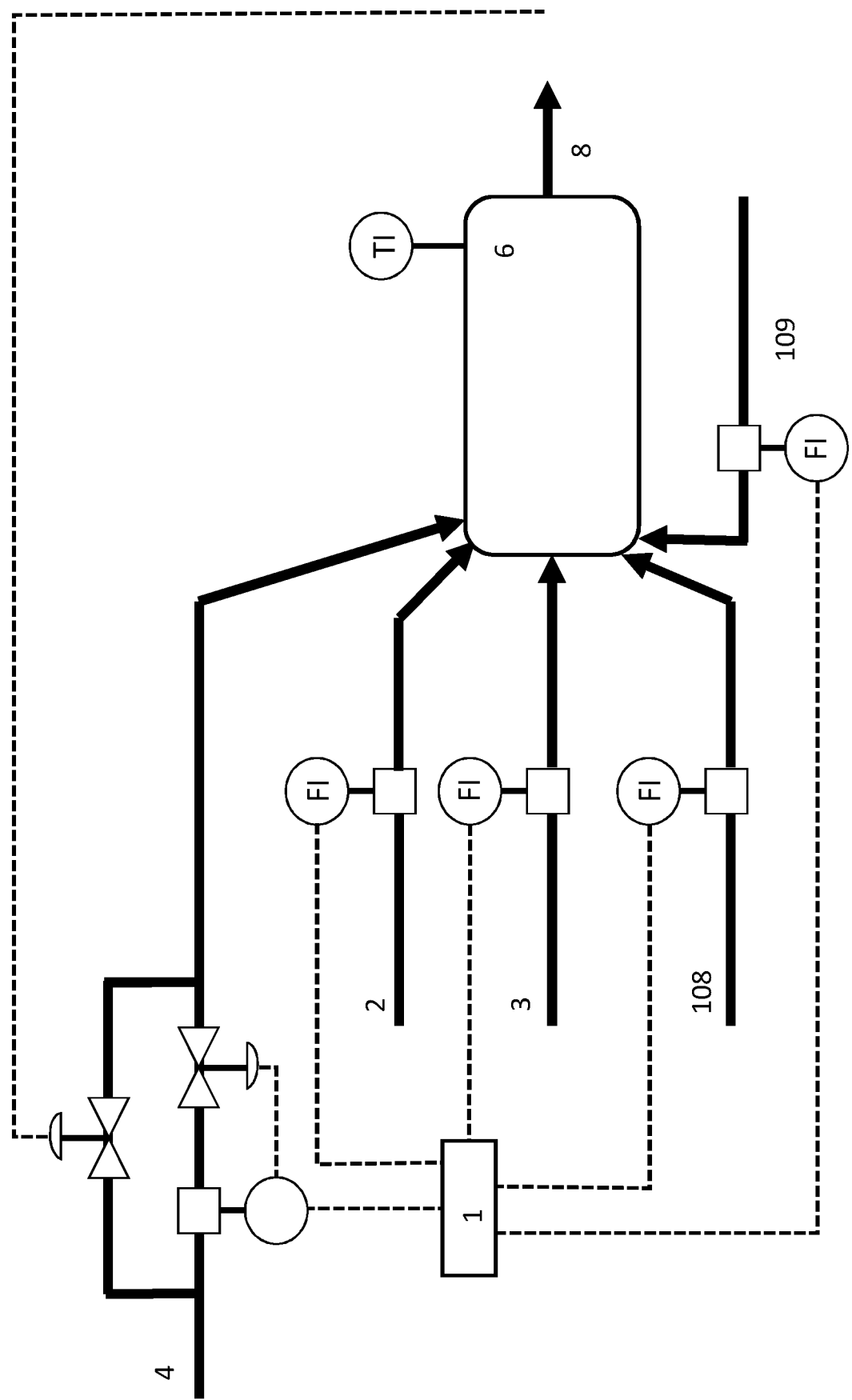
FIG. 5 depicts the control system for combustion air addition to the Claus burner.

FIG. 5 shows the Claus reaction furnace configuration and a related control scheme. The Claus reaction furnace (6) receives the following feed streams: one or more feed gas(es) comprising $H_2S$ (2), a fuel gas (3), sulfuric acid (108) and an optional atomizing media (109), which is typically compressed air but can also be e.g. $N_2$ and steam. Each line is equipped with a flow measurement device, FI, which gives information about the flow to a calculation unit (1). The output from the calculation unit is the air demand, and this value is sent to the flow controller, FIC, on the combustion air line (4). The main part of the combustion air flow is controlled with the air demand calculated in the calculation unit (1) and a minor part is adjusted by a measurement of the $H_2S/SO_2$ ratio in the Claus tail gas (e.g. stream 36 in FIG. 1).

Example 1: Calculation of Combustion Air

Example 1.1: Calculation of Combustion Air Demand for a Fuel Gas

The flow of combustion air to the Claus reaction furnace is typically controlled by measuring the other feed gas flows and by use of their composition, the air demand per unit feed gas flow can be calculated and the total air demand is calculated by adding air demands for each of the feed streams:

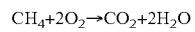

$$G_{air} = \Sigma K_i \cdot G_i$$

$K_i$ is the air demand factor with the unit flow of air per flow of feed stream i and $G_i$ is the flow of feed stream i. The units can be chosen freely, depending on the nature of the feed stream, however care should be given to ensure that the units for each air demand number ($K_i \cdot G_i$) are equal. For gas streams, typical flow units are $Nm^3/h$, kg/h and kmol/h and for liquid streams, $m^3/h$ and kg/h are most common.

The air demand factor, $K_i$, is calculated from the composition of the feed stream. For a feed stream containing 100 vol % $CH_4$, the air demand can be calculated from the following chemical reaction:

$$CH_4 + 2O_2 \rightarrow CO_2 + 2H_2O$$

Each $CH_4$ molecule requires 2 oxygen molecules for complete conversion to $CO_2$ and thus the $O_2$ demand factor, K, will be 2 $Nm^3 O_2$ per $Nm^3 CH_4$. 1 $Nm^3$ is defined as 1 $m^3$ gas at 0° C. and 1 atm and corresponds to 44.6 moles.

K can also be calculated as $Nm^3$ air per $Nm^3 CH_4$ by dividing with the mole fraction of $O_2$ in air. For a dry air, the mole fraction of $O_2$ in air is 0.21 and thus K becomes $2/0.21 = 9.52$ $Nm^3$ air per $Nm^3 CH_4$ If the concentration of $CH_4$ in the fuel gas was only 80%, the $O_2$ demand would also only be 80% and thus the K value would become $9.52 \cdot 0.80 = 7.62$ $Nm^3$ air per $Nm^3$ fuel gas.

If the fuel gas contains more than one oxygen demanding compounds (e.g. also $C_2H_5$ is present), the air demand for each compound are just added to a total oxygen demand.

Example 1.2: Calculation of Combustion Air Demand for a H$_2$S Gas

The O$_2$ demand for converting H$_2$S in a feed gas is calculated by taking into account that not full H$_2$S oxidation is desired, but rather a ratio of H$_2$S to SO$_2$ in the range 2-4 is desired.

The H$_2$S to SO$_2$ ratio, R, is defined as:

$$R = \frac{n_{H2S} \text{ in the Claus tail gas}}{n_{SO2} \text{ in the Claus tail gas}} = \frac{n_{H2S} \cdot (1-\alpha)}{n_{H2S} \cdot \alpha}$$

In the equation, n is the number of moles and a is the fraction of conversion of H$_2$S into SO$_2$. On the right hand side of the equation, nH$_2$S is the number of moles of H$_2$S in the feed gas.

The chemical reaction of H$_2$S oxidation is $$H_2S + 3/2 O_2 \rightarrow SO_2 + H_2O$$

Using the stoichiometry and rearranging the equation for R, the O$_2$ demand becomes $$n_{O2} = \frac{3 \cdot n_{H2S}}{2 \cdot (R+1)}$$

Where n$_{H2S}$ is the number of moles H$_2$S in the feed gas and nO$_2$ is the required number of moles O$_2$ needed to obtain the given H$_2$S to SO$_2$ ratio, R, in the converted gas. Taking into account the H$_2$S concentration in the feed gas, yH$_2$S (mole fraction) and O$_2$ in the combustion air, YO$_2$ (mole fraction) the air demand, G$_{air}$, becomes:

$$G_{air} = K_{ag} \cdot G_{ag} = \frac{3 \cdot y_{H2S}^{ag}}{2 \cdot (R+1) \cdot y_{O2}^{air}} \cdot G_{ag}$$

K$_{ag}$ is the acid gas air demand factor (Nm$^3$ air/Nm$^3$ acid gas) and G$_{ag}$ is the acid gas flow (Nm$^3$/h).

Example 1.3 Calculation of Combustion Air Demand for Sulfuric Acid

The sulfuric acid decomposes into SO$_2$, H$_2$O and O$_2$ according to the overall reaction:

$$H_2SO_4 \rightarrow SO_2 + H_2O + \tfrac{1}{2} O_2$$

The sulfuric acid both directly supplies O$_2$ to the reaction system, but also indirectly by supplying SO$_2$, which does not need to be formed by oxidation of H$_2$S (see example 2). Using the same principles as described in example 2, the O$_2$ demand becomes:

$$n_{O2} = -\left(\frac{1}{2} + \frac{3 \cdot R}{2 \cdot (R+1)}\right) \cdot n_{H2SO4}$$

R is the H$_2$S to SO$_2$ ratio as defined in example 2 and n$_{H2SO4}$ is the number of moles of H$_2$SO$_4$ in the sulfuric acid feed. The negative sign indicates that less O$_2$ is needed when H$_2$SO$_4$ is added.

Usually the flow of sulfuric acid is measured in mass flow and based on sulfuric acid concentration, C$_{sa}$ (kg H$_2$SO$_4$/kg acid), the air demand is calculated as $$G_{air} = K_{sa} \cdot M_{sa} = -C_{sa} \cdot \frac{1}{98 \cdot 0.0446 \cdot y_{O2}^{air}} \cdot \left(\frac{1}{2} + \frac{3 \cdot R}{2 \cdot (R+1)}\right) \cdot M_{sa}$$

M$_{sa}$ is the mass flow (kg/h) of sulfuric acid, C$_{sa}$ is the weight fraction of H$_2$SO$_4$ in the sulfuric acid, Y$_{O2}$ is the O$_2$ molar vapor fraction in the combustion air and R is H$_2$S to SO$_2$ ratio in the process gas.

Most often the sulfuric acid is atomized into the Claus reaction furnace through two-fluid nozzles using compressed air as the atomization media. In such a case, the atomization air flow will also result in a decrease in combustion air demand:

$$G_{air} = K_{aa} \cdot G_{aa} = -\frac{Y_{O2}^{aa}}{Y_{O2}^{air}} \cdot G_{aa}$$

If N$_2$ or steam is used as atomization media, the air demand factors will be 0.

Examples 2-6: Combinations of Claus Process and Sulfuric Acid Process

Five further examples have been analyzed for the process shown in FIG. 2, in comparison with the process of prior art as shown in FIG. 1.

These examples are based on the following feedstock gases:

Feed stock gas rich in H$_2$S (stream 2 in FIGS. 1 and 2):
Total gas flow: 8190 Nm$^3$/h
H$_2$S concentration: 94 vol %
H$_2$O concentration: 6 vol %
The rich H$_2$S gas is typical for refineries, and will also contain varying amounts of light hydrocarbons.

Feed stock gas rich in H$_2$S and NH$_3$ (stream 70 in FIGS. 1 and 2):
Total gas flow: 3669 Nm$^3$/h
H$_2$S concentration: 28 vol %
NH$_3$ concentration: 45 vol %
H$_2$O concentration: 27 vol %
These streams comprising H$_2$S and NH3 are typically waste gases from so-called sour water strippers and recognized as SWS-gases. They may also contain varying amounts of light hydrocarbons.

The fuel gas is a light hydrocarbon mixture (primarily CH$_4$), with a lower heating value of 12,200 kcal/Nm$^3$.

Feed streams, combustion air and Claus tail gas are preheated to the extent possible by utilizing heat evolved in the combined Claus+sulfuric acid process.

In these examples the Claus process operates with 94-95% recovery of sulfur from the feed, i.e. can be a well operated Claus plant with only 2 catalytic stages.

Example 2: Sequential Claus+Sulfuric Acid Process According to Prior Art

In example 2 all feed streams are treated in the Claus process, providing a stream of 11.7 t/h elemental sulfur and a Claus tail gas comprising ~5% of the S in the feed gases. In the Claus tail gas combustor, the sulfur species present in the Claus tail gas are oxidized and fuel gas is provided to maintain a combustor temperature of 1,000° C., such that all reduced species, such as CO, COS, H$_2$, H$_2$S, S$_x$ and CS$_2$, are fully oxidized to CO$_2$, H$_2$O and SO$_2$.

The production of concentrated sulfuric acid is 2.4 t/h, calculated as 100% w/w $H_2SO_4$.

The total sulfur and sulfuric acid recovery is >99.9% of the S in the feed, in compliance with even strict environmental legislation.

Example 3: Recycle of $H_2SO_4$ to Claus Reaction Furnace

In this example $H_2SO_4$ is not desired as a product and the entire acid production from the sulfuric acid process is recycled to the Claus reaction furnace. The amount of $H_2SO_4$ recycle corresponds to ~6% of the total S in the feed streams.

The total elemental sulfur product flow is now equal to the S in the feed streams, corresponding to 107% of the base case as described in example 3.

The temperature in the Claus reaction furnace decreases by ~200° C. due to the evaporation and decomposition of the $H_2SO_4$, but the temperature is still well above the minimum for complete burnout of hydrocarbons and $NH_3$. No fuel gas is needed in the Claus reaction furnace.

As $H_2SO_4$ is an excellent $O_2$ carrier, the combustion air requirements decrease and thus the process gas volume decreases as the flow of inert $N_2$ decreases. Overall the process gas flow out of the Claus reaction furnace decreases to 94% of the base flow and the process gas flow out of the Claus tail gas combustor decreases to 93% due to this reduction in $N_2$ flow. As less process gas needs to be heated to 1,000° C. in the Claus tail gas combustor, the fuel gas consumption is only 92% of the base case.

The benefit of recycling $H_2SO_4$ has been found surprisingly high, as not only has the sulfur forming capacity of the Claus plant increased by 7% but at the same time the process gas volume has been decreased by 6-7%. This corresponds to a Claus plant capacity increase of ~15%, provided that the process gas flow is at 100% of the base case.

Example 4: Recycle of $H_2SO_4$ to Claus Reaction Furnace and SWS Gas Bypass to Claus Tail Gas Combustor In this example, fuel gas consumption in the Claus tail gas combustor has been minimized by bypassing a fraction of the SWS gas to the Claus tail gas combustor. The SWS gas has a high heating value and can easily act as a fuel gas. The concentrated $H_2S$ feed gas could also have been used, but since the SWS gas can be problematic in the Claus process and is unproblematic in the WSA process, the bypassing of SWS gas has greater benefits than bypassing the $H_2S$ gas. Process gas wise there will also be a reduction in gas volume as the $NH_3$ in the SWS gas will increase the process gas volume in the Claus process due to the oxygen (air) requirements for combustion of $NH_3$ to $N_2$ and $H_2O$.

The amount of SWS gas recycled is adjusted such that 1,000° C. is achieved in the Claus tail gas combustor, ensuring complete burnout of reduced species from the Claus tail gas, such as $H_2S$, COS, CO, $H_2$, $S_x$ and $CS_2$.

Combustion of $NH_3$ will primarily form $N_2$, but minor amounts of $NO_x$ may also form and depending on the concentration, a SCR catalyst for reduction of $NO_x$ may be required.

The SCR catalyst requires $NH_3$ for the $NO_x$ reduction and that can be supplied from a storage of $NH_3$ or taken from the SWS gas.

Since the fuel gas in the Claus tail gas combustor now contains $H_2S$, the $H_2SO_4$ production will increase, now accounting for ~13% of the S in the feed streams. This large amount of sulfuric acid recycle result in a significant reduction in Claus reaction furnace temperature.

With proper feed stream preheating it is still possible to achieve sufficiently high temperature in the Claus reaction furnace without needing support fuel.

The effect on the size of the Claus process is substantial: the process gas volume is reduced to 65% of the base case, still with 107% elemental sulfur production. This process gas volume reduction can be either used for capacity boosting of an existing plant or significant cost reduction of a new plant.

Also the sulfuric acid plant will become smaller as the process gas flow is only 90% of the base case flow. This is surprising as the $H_2SO_4$ production has been more than doubled compared to the base case, but it is mainly due to the large reduction in Claus tail gas flow.

What is most remarkable is the reduction in fuel gas consumption that is now only 16% of the base case flow, contributing to a significantly lower operational cost of the integrated Claus+sulfuric acid process.

Example 5: Recycle of $H_2SO_4$ and Complete Bypass of SWS Gas to Claus Tail Gas Combustor This example focus on the complete elimination of the SWS gas to the Claus plant, ensuring that ammonia salt formation in the sulfur condensers is impossible and thus decreases the risk of failure of the Claus plant.

The process gas flow out of the Claus reaction furnace is 69% of the base case, but a little higher compared to example 3 where only a fraction of the SWS gas is bypassed. The increase in process gas flow is due to requirement of fuel gas addition to the Claus reaction furnace to maintain the high operating temperature.

The $H_2SO_4$ production in the WSA plant has now increased to 17% of the S in the feed gases, recycling of the entire production now quenches the Claus reaction furnace temperature to an extent where fuel gas is required. The process gas from the Claus tail gas combustor has increased to 107% of the base case, due to the increased sulfur feed to the sulfuric acid plant.

Even if fuel gas is needed in the Claus reaction furnace, the total flow of fuel gas is only 41% of the base case.

From a plant size and operational cost point of view, this example seems less optimal than example 3, i.e. there is an optimum of $H_2SO_4$ recycle ratio which depends on the actual feed gas flows and compositions. Bypassing even more feed stock gas will result in an increased sulfuric acid production, which will quench the Claus reaction furnace even more which again will require more fuel gas and therefore the Claus tail gas flow will increase.

For the feed gas compositions and flows described above, the optimum with regard to plant sizes and fuel consumption is with a $H_2SO_4$ recycle flow between 13% and 17% of the S feed in the feed streams.

In general, the optimal feed stock gas bypass is close to the point where the Claus reaction furnace operates at the minimum allowable temperature, i.e. the feed stock can be bypassed to produce more sulfuric acid until the Claus reaction furnace temperature reaches the limit for thermal destruction of hydrocarbons and sulfuric acid. Increasing the feed stock bypass ratio will reduce the fuel gas need in the Claus tail gas combustor, but will increase the fuel gas consumption in the Claus reaction furnace by a much larger ratio as the fuel gas in the Claus reaction furnace need to evaporate and decompose the sulfuric acid and heat up the process gas, whereas in the Claus tail gas combustor only heating up of process gas is required.

For a feed stock gas with e.g. 50 vol % $H_2S$, the optimal $H_2SO_4$ recycle flow is ~7% of the S feed in the feed stream. The acid gas bypass to the Claus tail gas combustor is only 2% as the relatively low $H_2S$ concentration result in a low temperature in the Claus reaction furnace and thus the sulfuric acid will quickly reduce the temperature and require fuel gas addition in the Claus reaction furnace. Using $O_2$ enriched air in the Claus reaction furnace will allow for a higher $H_2SO_4$ recycle flow.

Example 6: Recycle of $H_2SO_4$, Bypass of SWS Gas to Claus Tail Gas Combustor and Use of $O_2$ Enriched Air To boost Claus plant capacity, a well-known revamp option is to install special burners which can handle enriched air with >21 vol % $O_2$, a common $O_2$ quality is 93-99 vol % $O_2$.

In this example an enriched air with 80 vol % $O_2$ is used as in the Claus process, whereas atmospheric air is used in the sulfuric acid process.

The effect of the enriched air is a significantly reduced process gas flow out of the Claus reaction furnace, mainly due to the reduced amount of $N_2$ associated with the $O_2$ flow. Also the lower process gas flow enables operation of the Claus reaction furnace without fuel addition, as less inert gas has to be heated.

Since the process gas flow out of the Claus reaction furnace is now reduced to only 38% of the base case, the Claus tail gas feed to the Claus tail gas combustor is also significantly decreased. The process gas out of the Claus tail gas combustor is only 56% of the base case, it is relatively higher than the Claus plant flow due to the large amount of SWS gas bypass to the WSA plant.

With this layout it is possible to operate without fuel gas in both Claus and sulfuric acid processes, even with this high recycle flow of $H_2SO_4$ from the sulfuric acid process.

Examples 2-6 are summarized in Table 2, which show the potential for increased sulfur production, reduced fuel gas consumption and possibly reduced plant size by the well considered revamping of a Claus process plant with integration of a sulfuric acid process. It is furthermore seen that the saving in fuel gas consumption becomes reduced when more sulfuric acid is recycled.

TABLE 2

| Example# | 2 | 3 | 4 | 5 | 6 |
|---|---|---|---|---|---|
| Sulfur production | 100% | 107% | 107% | 107% | 107% |
| $H_2SO_4$ production | 6% | No | No | No | No |
| $H_2SO_4$ recycle | 0% | 6% | 13% | 17% | 13% |
| Acid gas feed to Claus | 100% | 100% | 100% | 100% | 100% |
| SWS gas feed to Claus | 100% | 100% | 33% | 0% | 19% |
| Process gas out Claus reaction furnace | 100% | 94% | 65% | 69% | 38% |
| Process gas out Claus tail gas combustor | 100% | 93% | 90% | 107% | 56% |
| Fuel gas consumption | 100% | 92% | 16% | 41% | 0% |

The invention claimed is:

1. A revamp process for modifying a sulfur abatement plant comprising a Claus process plant producing elemental sulfur, said Claus process plant comprising a Claus reaction furnace and 1 or more Claus conversion stages, each Claus conversion stage comprising a conversion reactor and a means for elemental sulfur condensation, and a means of Claus tail gas oxidation configured for receiving a Claus tail gas from said Claus process plant and configured for providing an oxidized Claus tail gas, said process revamp comprising the steps of
a. providing a sulfuric acid producing tail gas treatment plant producing sulfuric acid, and
b. providing a means for transferring an amount or all of the sulfuric acid produced in said sulfuric acid producing tail gas treatment plant to said Claus reaction furnace, wherein the moles of sulfur in the transferred sulfuric acid relative to the moles of elemental sulfur withdrawn from said Claus process plant is from 3% to 25%.

2. The revamp process of claim 1, further comprising the step of limiting the number of Claus conversion stages to two if the Claus process plant comprises more than two Claus conversion stages.

3. A revamp process according to claim 1, wherein step (a) involves providing a sulfuric acid producing tail gas treatment plant comprising a catalytic $SO_2$ converter, comprising a material catalytically active in oxidation of $SO_2$ to $SO_3$, configured for receiving said oxidized Claus tail gas and configured for providing a $SO_2$ converter off gas and a sulfuric acid unit, being configured for receiving said $SO_2$ converter off gas, producing concentrated sulfuric acid either by condensation of hydrated $SO_3$ or by absorption of $SO_3$ in sulfuric acid.

4. A revamp process according to claim 1, further comprising the step of providing a means for temporary storing sulfuric acid produced in said sulfuric acid producing tail gas treatment plant, having a volume corresponding to the amount of sulfuric acid produced in said sulfuric acid producing tail gas treatment plant in from 4 hours, 8 hours or 24 hours to 50 hours or 120 hours, wherein said means for storing sulfuric acid is configured for receiving sulfuric acid from said sulfuric acid producing tail gas treatment plant and for directing sulfuric acid to said Claus reaction furnace.

5. A revamp process according to claim 1, comprising the step of providing a means for flow control, user-configurable for allowing the outlet from said means of Claus tail gas oxidation to by-pass said sulfuric acid producing tail gas treatment plant.

6. A revamp process according to claim 1, comprising the step of providing a means for catalytic oxidation of at least an amount of said Claus tail gas.

7. A revamp process according to claim 6, wherein said means for catalytic oxidation is configured for receiving at least an amount of the Claus tail gas and in combination with one or more of an oxidant, a heated gas, a recycled process gas and a heat exchanger, such that the temperature at the inlet of the means of catalytic oxidation is above 200° C. and the temperature at the outlet of the means of catalytic oxidation is below 500° C.

8. A revamp process according to claim 1, wherein said Claus reaction furnace is provided with one or more inlet nozzles configured for atomizing said amount of sulfuric acid to a droplet size distribution, in which 90% of the mass of droplets have a diameter smaller than 500 µm.

9. A revamp process according to claim 8, wherein said inlet nozzles are pressure nozzles or two phase nozzles.

10. A revamp process according to claim 8, wherein said inlet nozzles are positioned in a distance downstream the gas inlet of the Claus reaction furnace, corresponding to at least 1 second residence time of the process gas.

11. A revamp process according to claim 1, wherein said Claus reaction furnace is extended by a volume providing an increase of residence time of the process gas of at least 1 second.

12. A revamp process according to claim 1, wherein the Claus reaction furnace is provided with a means for impaction.

13. A revamp process according to claim 1, wherein the Claus reaction furnace is provided with a means for turbulence enhancement.

14. A revamp process according to claim 1, wherein the control scheme for the amount of oxygen directed to the Claus reaction furnace is modified to be dependent on a combination of feed forward control based on the amount and composition of feedstock and sulfuric acid and feedback control based on the ratio of $H_2S$ to $SO_2$ in the inlet stream to the final Claus conversion stage or the outlet stream from the final Claus conversion stage.

15. A revamp process according to claim 1, wherein the outlet from the Claus reaction furnace is directed to an $SO_3$ guard, absorbing or converting $SO_3$, providing a substantially $SO_3$ free Claus reaction furnace outlet gas.

16. A revamp process according to claim 1, wherein the concentrated sulfuric acid contains from 90% w/w to 98.5% w/w $H_2SO_4$.

* * * * *